United States Patent
Davidson et al.

(10) Patent No.: US 9,316,121 B2
(45) Date of Patent: Apr. 19, 2016

(54) SYSTEMS AND METHODS FOR PART LOAD CONTROL OF ELECTRICAL POWER GENERATING SYSTEMS

(71) Applicant: SuperCritical Technologies, Inc., Bremerton, WA (US)

(72) Inventors: Chal S. Davidson, Bremerton, WA (US); Steven A. Wright, Albuquerque, NM (US)

(73) Assignee: SuperCritical Technologies, Inc., Bremerton, WA (US)

( * ) Notice: Subject to any disclaimer, the term of this patent is extended or adjusted under 35 U.S.C. 154(b) by 318 days.

(21) Appl. No.: 13/843,668

(22) Filed: Mar. 15, 2013

(65) Prior Publication Data

US 2014/0088773 A1 Mar. 27, 2014

Related U.S. Application Data

(60) Provisional application No. 61/744,439, filed on Sep. 26, 2012.

(51) Int. Cl.
*F01K 25/08* (2006.01)
*F01K 7/32* (2006.01)
(Continued)

(52) U.S. Cl.
CPC . *F01K 7/32* (2013.01); *F01K 23/06* (2013.01); *F01K 25/103* (2013.01); *F24H 9/0005* (2013.01); *G05F 1/66* (2013.01); *H02J 4/00* (2013.01); *H02K 7/18* (2013.01)

(58) Field of Classification Search
CPC ............. F01K 3/00; F01K 3/185; F01K 7/00; F01K 7/08; F01K 7/16; F01K 9/02; F01K 13/00; F01K 13/02; F01K 25/08; F01K 25/10; F01K 25/103; F01K 11/02; F01K 11/04
USPC ............................. 60/647, 648, 650, 682, 684
See application file for complete search history.

(56) References Cited

U.S. PATENT DOCUMENTS 3,939,328 A * 2/1976 Davis .............................. 700/41
4,498,289 A 2/1985 Osgerby
(Continued)

FOREIGN PATENT DOCUMENTS

WO WO-2007131281 A1 11/2007
WO WO-2012049259 A1 4/2012

OTHER PUBLICATIONS

Conboy et al., "Experimental Investigation of the S-CO2 Condensing Cycle," In Proceedings of the Supercritical CO2 Power Cycle Symposium, Boulder, Colorado, May 24-25, 2011, 14 pages.
(Continued)

*Primary Examiner* — Jesse Bogue
*Assistant Examiner* — Laert Dounis
(74) *Attorney, Agent, or Firm* — Robert R. Richardson

(57) ABSTRACT

Disclosed illustrative embodiments include systems for part load control of electrical power generating systems and methods of operating a system for part load control of electrical power generating systems. A representative system includes a computer controller system operatively coupled to an electrical power generator and programmed to control a compressor inlet pressure responsive to a level of electrical power output requested of the electrical power generator, and a reservoir with supercritical fluid, responsive to the computer controller system and in fluid communication with the electrical power generating system between a compressor outlet and an expander inlet, and between an expander outlet and a compressor inlet.

26 Claims, 19 Drawing Sheets

(51) Int. Cl.

| | |
|---|---|
| F01K 23/06 | (2006.01) |
| F01K 25/10 | (2006.01) |
| F24H 9/00 | (2006.01) |
| H02K 7/18 | (2006.01) |
| G05F 1/66 | (2006.01) |
| H02J 4/00 | (2006.01) |

(56) References Cited

U.S. PATENT DOCUMENTS

| | | | |
|---|---|---|---|
| 4,765,143 | A | 8/1988 | Crawford et al. |
| 6,470,683 | B1 | 10/2002 | Childs et al. |
| 6,581,384 | B1 | 6/2003 | Benson |
| 7,313,926 | B2 | 1/2008 | Gurin |
| 7,685,820 | B2* | 3/2010 | Litwin et al. ............... 60/641.11 |
| 7,900,450 | B2 | 3/2011 | Gurin |
| 8,015,812 | B1 | 9/2011 | Kesseli et al. |
| 8,096,128 | B2 | 1/2012 | Held et al. |
| 8,099,198 | B2 | 1/2012 | Gurin |
| 8,132,412 | B2 | 3/2012 | Bennett |
| 8,166,761 | B2 | 5/2012 | Moghtaderi et al. |
| 8,397,506 | B1 | 3/2013 | Wright et al. |
| 8,613,195 | B2 | 12/2013 | Held et al. |
| 8,820,083 | B2 | 9/2014 | Davidson et al. |
| 9,032,734 | B2 | 5/2015 | Davidson et al. |
| 2004/0244376 | A1 | 12/2004 | Litwin et al. |
| 2010/0024421 | A1 | 2/2010 | Litwin et al. |
| 2010/0287934 | A1* | 11/2010 | Glynn et al. ..................... 60/645 |
| 2011/0061384 | A1* | 3/2011 | Held et al. ........................ 60/645 |
| 2012/0017597 | A1 | 1/2012 | Freund et al. |
| 2012/0047892 | A1* | 3/2012 | Held et al. ........................ 60/652 |
| 2012/0067055 | A1 | 3/2012 | Held |
| 2012/0102996 | A1 | 5/2012 | Freund |
| 2012/0128463 | A1 | 5/2012 | Held |
| 2012/0131921 | A1 | 5/2012 | Held |
| 2013/0033044 | A1 | 2/2013 | Wright et al. |

OTHER PUBLICATIONS

Lewis et al., "Supercritical CO2 Mixture Behavior for Advanced Power Cycles and Applications," In Proceedings of Supercritical CO2 Power Cycle Symposium, Boulder, Colorado, May 24-25, 2011, 2 pages.

Sienicki et al., "Scale Dependencies of Supercritical Carbon Dioxide Brayton Cycle Technologies and the Optimal Size for a Next-Step Supercritical CO2 Cycle Demonstration," in Proceedings of the Supercritical CO2 Power Cycle Symposium, Boulder, Colorado, 2011, 5 pages.

Suo-Anttila et al., "Computational Fluid dynamics Code for Supercritical fluids," in Proceedings of the Supercritical CO2 Power Cycle Symposium, Boulder, Colorado, 2011, 8 pages.

Vilim et al., "Dynamic System Analysis of a SuperCritical CO2 Compression Loop," In Proceedings of International Congress on Advances in Nuclear Power Plants, Anaheim, CA, USA, Jun. 8-12, 2008, 7 pages.

Wright et al., "Break-even Power Transients for two Simple Recuperated S- CO2 Brayton Cycle Test Configurations," in Proceedings of Supercritical CO2 Power Cycle Symposium, Boulder, Colorado, May 24-25, 2011, 31 pages.

Wright et al., "Closed Brayton Cycle Power Conversion Systems for Nuclear Reactors," Modeling, Operations, and Validation, SAND2006-2518, Sandia National Laboratories, Albuquerque, NM, 2006, first section of pp. 1- 150.

Wright et al., "Closed Brayton Cycle Power Conversion Systems for Nuclear Reactors," Modeling, Operations, and Validation, SAND2006-2518, Sandia National Laboratories, Albuquerque, NM, 2006, second section of pp. 151- 257.

Wright et al., "Description and Test Results from a Supercritical CO2 Brayton Cycle Development Program," Aug. 2009, Sandia National Laboratories, Albuquerque, New Mexico, American Institute of Aeronautics and Astronautics, 13 pages.

Wright et al., "Dynamic Modeling and Control of Nuclear Reactors Coupled to Closed-Loop Brayton Cycle Systems using Simulink," in Proceedings of Space Technology and Applications International Forum (STAIF-2005), Feb. 2005, 14 pages.

Wright et al., "Impact of Closed Brayton Cycle Test Results on Gas Cooled Reactor Operation and Safety", in Proceedings of International Congress on Advances in Nuclear Power Plants, Nice, France May 13-18, 2007, 9 pages.

Wright et al., "Initial status and test results from a SuperCritical CO2 Brayton Cycle Test Loop," in Proceedings of International Congress on Advances in Nuclear Power Plants, Anaheim, CA, USA, Jun. 8-12, 2008, 8 pages.

Wright et al., "Modeling and experimental results for condensing supercritical CO2 power cycles," Sandia Report SAND2010-8840, 2011, 47 pages.

Wright et al., "Operation and Analysis of a Supercritical CO2 Brayton Cycle," SAND2010-0171, Sep. 2010, 45 pages.

Wright et al., "Operational Curves for HTGR's Coupled to Closed Brayton Cycle Power Conversion Systems", in Proceedings of International Congress on Advances in Nuclear Power Plants, Jun. 4-8, Reno, 2006, 8 pages.

Wright et al., "Operational Results of a Closed Brayton Cycle Test-Loop," Proceedings of Space Technology and Applications, International Forum (STAIF-2005), Albuquerque, New Mexico Feb. 2005, 12 pages.

Wright et al., "Self-Driven Decay Heat Removal in a GCR Closed Brayton Cycle Power System," in Proceedings of International Congress on Advances in Nuclear Power Plants, Jun. 4-8, 2006, 9 pages.

Wright et al., "Summary of the Sandia Supercritical CO2 Development Program," in Proceedings of Supercritical CO2 Power Cycle Symposium, Boulder, Colorado, May 24-25, 2011, 16 pages.

Wright et al., "SuperCritical CO2 Brayton Cycle Compression and Control Near the Critical Point," In Proceedings of International Congress on Advances in Nuclear Power Plants, Anaheim, CA, USA, Jun. 8-12, 2008, 10 pages.

Wright et al., "Supercritical CO2 Direct Cycle Gas Fast Reactor (SC-GFR) Concept, in Proceedings of the Supercritical CO2 Power Cycle Symposium," Boulder, Colorado, May 24-25, 2011, 9 pages.

Wright et al., "Turbomachinery Scaling Considerations for Supercritical CO2 Brayton Cycles," DOE-letter GenIV level 3 report Dec. 31, 2009, 13 pages.

Wright, "Non-Nuclear Validation Test Results of a Closed Brayton Cycle Test-Loop," AIP Conf. Proc. 880, pp. 157-166, Space Technology and Application International Forum-STAIF 2007, 10 pages.

Wright, "Preliminary Results of Dynamic System Model for a Closed-Loop Brayton Cycle Coupled to a Nuclear Reactor," in Proceedings 1st International Energy Conversion Engineering Conference, 17-21 Portsmouth, VA, Aug. 17-21, 2003, 12 pages.

Angelino, "Carbon Dioxide Condensation Cycles for Power Production," Contributed by the Gas Turbine Division for presentation at the Gas Turbine Conference, Washington D. C., Mar. 17-21, 1968, of The American Society of Mechanical Engineers, Manuscript retrieved at ASME Headquarters, Dec. 28, 1967, Paper No. 68-CT-23, 9 pages.

Angelino, "Perspectives for the Liquid Phase Compression Gas Turbine," Contributed by the Gas Turbine Conference and Products Show, Zurich, Switzerland, Mar. 13-17, 1966, of The American Society of Mechanical Engineers, Manuscript received at ASME Headquarters, Dec. 15, 1965, Paper No. 66-CT-111, 10 pages.

Angelino, "Real Gas Effects in Carbon Dioxide Cycles," Contributed by the Gas Turbine Division of The American Society of Mechanical Engineers for presentation at the International Gas Turbine Conference & Products Show, Cleveland, Ohio, Mar. 10-13, 1969, 12 pages.

Conboy, et al., "Performance Characteristics of an Operating Supercritical CO2 Brayton Cycle," Draft, Proceedings of the ASME Turbo Expo 2012, Jun. 11-15, 2012, Copenhagen, Denmark, 12 pages.

Dostal, et al., "A Supercritical Carbon Dioxide Cycle for Next Generation Nuclear Reactors," Advanced Nuclear Power Technology Program, MIT-ANP-TR-100, Mar. 10, 2004,160 pp. 1 of 2.

(56) References Cited

OTHER PUBLICATIONS

Dostal, et al., "A Supercritical Carbon Dioxide Cycle for Next Generation Nuclear Reactors," Advanced Nuclear Power Technology Program, MIT-ANP-TR-100, Mar. 10, 2004,165 pp. 2 of 2.

International Search Report and Written Opinion for PCT/US2013/060199 Mailed Dec. 13, 2013, 10 pages.

Muto, et al., "Optimal Cycle Scheme of Direct Cycle Supercritical CO2 Gas Turbine for Nuclear Power Generation Systems," International Conference on Power Engineering 2007, Oct. 23-27, 2007, Hangzhou, China, 7 pages.

* cited by examiner

SYSTEMS AND METHODS FOR PART LOAD CONTROL OF ELECTRICAL POWER GENERATING SYSTEMS

CROSS-REFERENCE TO RELATED APPLICATION

The present application claims priority to U.S. Provisional Application 61/744,439, filed Sep. 26, 2012, entitled "MODULAR POWER INFRASTRUCTURE," and incorporated herein by reference. To the extent the foregoing application and/or any other references incorporated herein by reference conflict with the present disclosure, the present disclosure controls.

BACKGROUND

The present application is related to working fluids and their use in thermodynamic cycles.

SUMMARY

Disclosed illustrative embodiments include systems for part load control of electrical power generating systems and methods of operating a system for part load control of electrical power generating systems.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
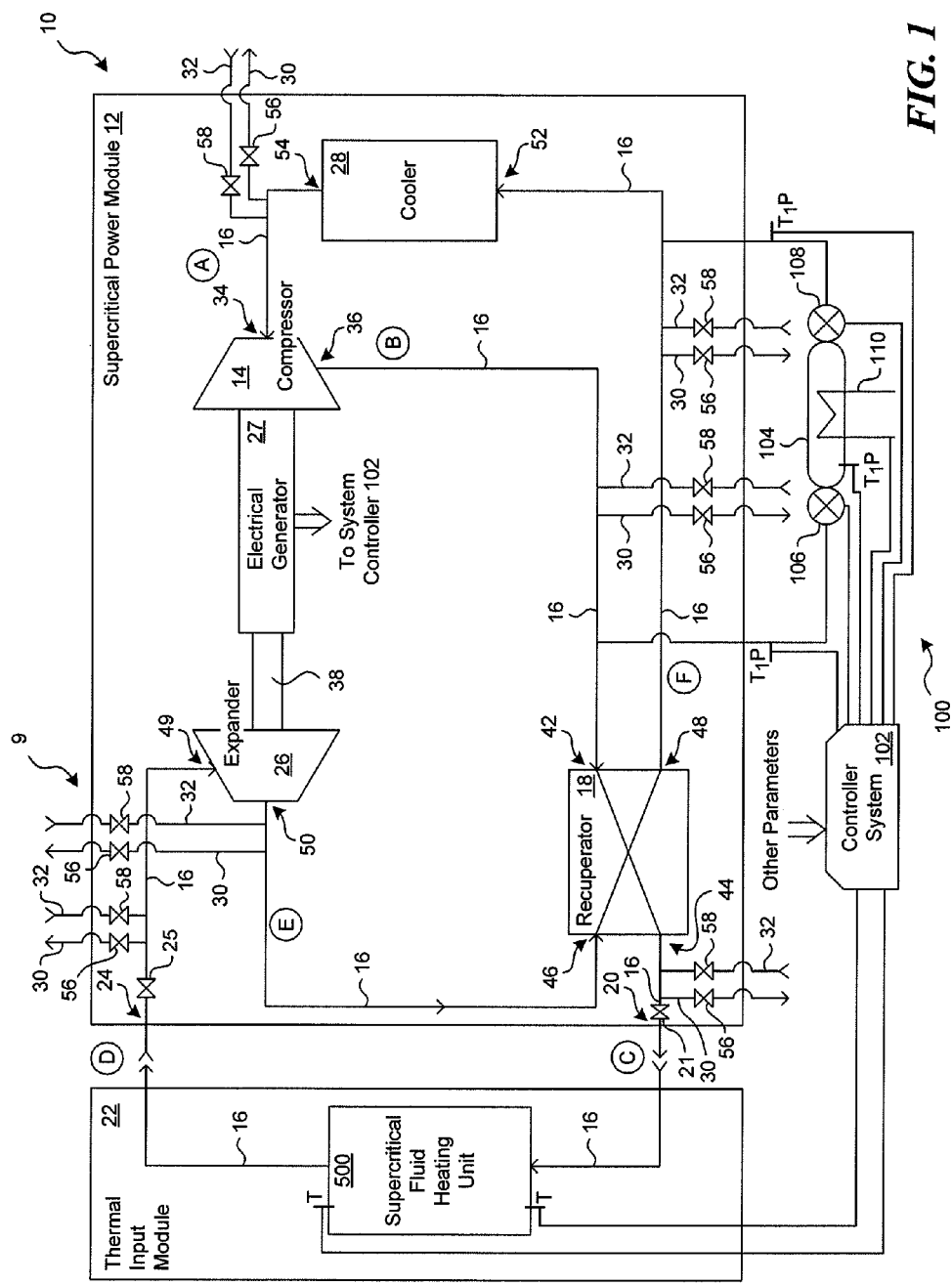
FIG. 1 is a schematic illustration of an illustrative embodiment of an electrical power generating system.

In the following detailed description, reference is made to the accompanying drawings, which form a part hereof. In the drawings, similar symbols typically identify similar components, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Many embodiments of the technology described below may take the form of computer-executable instructions, including routines executed by a programmable computer. Those skilled in the relevant art will appreciate that the technology can be practiced on computer systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. In particular embodiments, data structures and transmissions of data particular to aspects of the technology are also encompassed within the scope of the technology.

Overview

Given by way of overview, disclosed illustrative embodiments include systems for part load control of electrical power generating systems and methods of operating a system for part load control of electrical power generating systems.

Referring briefly to FIG. 1, in an illustrative embodiment given by way of non-limiting example, an illustrative part load control system 100 is provided for controlling partial loading of an electrical power generator 27 in an electrical power generating system 9 operative to execute a thermodynamic cycle using a supercritical fluid 16 and including at least a first compressor 14 having an inlet 34 and an outlet 36 and being structured to compress supercritical fluid 16 and an expander 26 having an inlet 49 coupled to receive compressed supercritical fluid 16, having an outlet 50, and being structured to convert a drop in enthalpy of supercritical fluid 16 to mechanical energy and the electrical power generator 27 coupled to the expander 26. In non-limiting embodiments, the part load control system 100 includes a controller system 102 configured to control compressor inlet 34 pressure responsive to level of electrical power output requested of the electrical power generator 27 and a reservoir 104 with supercritical fluid 16, the reservoir 104 being operatively coupleable, responsive to the controller system 102, in fluid communication between the compressor outlet 36 and the expander inlet 49 and between the expander outlet 50 and the compressor inlet 34. As used herein, "supercritical" fluid refers to a fluid that is in a supercritical state during one or more operational portions of a cycle.

Continuing by way of overview, embodiments of part load control systems disclosed herein provide part load control of generated electrical power (that is, control of a partially-loaded electrical power generator) by controlling the inlet pressure of a compressor in an electrical power generating system operative to execute a thermodynamic cycle using a supercritical fluid responsive to a level of electrical power output requested of the electrical power generator. Because the power cycle is closed (such as without limitation a closed loop Brayton cycle), the average density of the supercritical fluid in the closed loop advantageously can be adjusted up or down by changing the compressor inlet pressure. Therefore, even though compressor and turbine shaft-speed may remain substantially constant, the mass flow rate of the supercritical fluid through the closed loop may be controlled by changing the compressor inlet pressure, thereby affecting the generated electrical power. As such and as will be described below, embodiments of part load control systems disclosed herein can help adjust power generated without shaft speed changes of turbomachinery, and/or can help changes in electrical power be made while mitigating impact on system efficiency, and/or can help mitigate component temperature changes regardless of part load power.

Various embodiments of part load control systems may be used with any suitable electrical power generating system operative to execute a suitable thermodynamic cycle including most types of closed-loop Brayton cycles (including electrical power generating systems having any one of more of the following features: re-heating, inter-cooling, simple recuperation, recompression, and/or compressor recuperation). To that end, examples of electrical power generating systems disclosed herein (that use simple recuperation, recompression, and compressor recuperation) are set forth by way of non-limiting examples for purposes of illustration and not of limitation. No limitation to examples of electrical power generating systems disclosed herein is intended and no such limitation is to be inferred.

As is known, the Brayton thermodynamic cycle is generally characterized by pressurization of a working fluid such as by compression and/or pumping, heat addition to the working fluid, expansion of the heated and pressurized fluid in a device for converting kinetic, thermal, or potential energy of the working fluid to mechanical energy, and then rejection of energy from the working fluid. In a closed system, after expansion the working fluid is re-pressurized, and the working fluid undergoes the above process in a cyclical manner.

As is also known, working fluids may be capable of transitioning to a supercritical state at one or more points of the thermodynamic cycle process. In addition, the working fluid may be entirely within a supercritical state at every point of the thermodynamic cycle. As is also known, a supercritical state is defined as a state of temperature and pressure above the critical point of the fluid. When in the supercritical state, the fluids are capable of transitioning to higher pressure with small amounts of change in entropy, relative to pressurization of the fluid in its ideal state. The compressibility of supercritical fluids allows for a reduced number of compression stages relative to similar compression of a fluid in the gaseous state. Supercritical fluids also exhibit reduced viscosity and surface tension relative to their fluid states. The combination of these features allows supercritical working fluids to exhibit high rates of mass flow in rotating machinery, thereby reducing required areal size of the rotating machinery to achieve a given amount of work output.

Any one or more of several supercritical fluids, such as Xe, Kr, $CO_2$, and/or He, may be used in various embodiments. These supercritical fluids may be in the form of mixtures as well as in a pure form. These supercritical fluids may also be mixed with any number of suitable organic gases or gaseous impurities. For sake of brevity, this discussion will generally relate to use of $CO_2$ in the supercritical state (sometimes referred to as "$sCO_2$"); however, it will be understood that similar principles apply to the other above-mentioned supercritical fluids or mixtures thereof. To that end, any one or more of the above-mentioned supercritical fluids may be used as desired for a particular application. For example, considerations for use of any particular supercritical fluid may include choice of operating temperature or pressure of a desired thermomechanical energy conversion system. Accordingly, limitation to any particular supercritical fluid is not intended and is not to be inferred.

To that end, illustrative embodiments of systems for part load control of electrical power generating systems will be discussed below by way of non-limiting examples. Non-limiting examples of illustrative electrical power generating systems (having part load control systems) that use simple recuperation, recompression, and compressor recuperation will be explained. In addition, modular power infrastructure networks that include various embodiments of illustrative electrical power generating systems (having part load control systems) will be discussed below by way of non-limiting examples.

Part Load Control in Simple Recuperated Brayton Cycle

Referring back to FIG. 1, in an embodiment the illustrative part load control system 100 controls an illustrative electrical power generating system 9 operative to execute a thermodynamic cycle using a supercritical fluid 16. In various embodiments, the electrical power generating system 9 includes a supercritical power module 12 and a heat source, such as a thermal input module 22, and operates according to a closed-loop Brayton thermodynamic cycle including simple recuperation. An illustrative embodiment of the electrical power generating system 9 will be explained first by way of non-limiting example, followed by an explanation by way of non-limiting example of an illustrative embodiment of the part load control system 100.

Turning first to an embodiment of the electrical power generating system 9 and given by way of illustration only and not of limitation, in some embodiments the supercritical power module 12 and the thermal input module 22 may be provided as separate modules; that is, the supercritical power module 12 and the thermal input module 22 each may be provided in its own housing, enclosure or the like. In such embodiments, supercritical fluid 16 may exit the supercritical power module 12 and enter the thermal input module 22, be heated by the thermal input module 22, and then exit the thermal input module and enter the supercritical power module 12.

However, the supercritical power module 12 and the thermal input module 22 need not be provided as separate modules. To that end, in some embodiments the supercritical power module 12 and the thermal input module 22 may be provided together in one housing, enclosure, or the like. In some such embodiments, the one housing, enclosure, or the like may be considered a "module" (as discussed below). However, the one housing, enclosure, or the like need not be a "module." To that end, in some other such embodiments the one housing, enclosure, or the like may not be considered a "module."

The supercritical power module 12 can convert a drop in enthalpy of the supercritical fluid 16 to mechanical energy (and, in some embodiments discussed later, may supply supercritical fluid to any other suitable modules that may be coupled to receive supercritical fluid from the supercritical power module 12). As discussed above, the supercritical power module 12 operates according to a Brayton thermodynamic cycle. In the embodiment shown in FIG. 1, the supercritical power module 12 implements a simple recuperated Brayton cycle (as will be explained below with reference to FIG. 2).

In the embodiment shown in FIG. 1 and as will be explained below with details given by way of illustration and not limitation, the supercritical power module 12 suitably includes the compressor 14, a recuperator 18, an outlet path 20, an inlet path 24, the expander 26, the at least one electrical power generator 27, and a cooler 28. As will also be explained below, in some embodiments the supercritical power module 12 may include at least one supercritical fluid supply path 30 and at least one supercritical fluid return path 32.

The compressor 14 is structured to compress, that is raise the pressure of, the supercritical fluid 16. The compressor 14 has an inlet 34 and an outlet 36. In various embodiments, the compressor 14 suitably may be implemented as any suitable device, such as a compressor or a pump or the like, that raises the pressure of the supercritical fluid 16. In some embodiments, the compressor 14 is operatively coupled to the expander 26 with a shaft 38. In such embodiments, the expander 26 converts a drop in enthalpy of the supercritical fluid 16 to mechanical energy that includes rotation of the shaft 38, thereby rotating the compressor 14. It will be appreciated that operatively coupling of the compressor 14 to the expander 26 may be made via a mechanical coupling (such as a gearbox or the like) or, if desired, a magnetic coupling.

The recuperator 18 is structured to heat the compressed supercritical fluid 16. The recuperator 18 suitably is any suitable type of heat exchanger, such as a tube-and-shell heat exchanger, a printed circuit heat exchanger, or the like. The heat exchanger of the recuperator 18 may be implemented using any suitable flow orientation as desired, such as a cross-flow orientation, a counter-flow orientation, or a parallel-flow orientation. The recuperator 18 suitably is sized to have a selected heat transfer capacity as desired for a particular application. In the embodiment shown in FIG. 1, the recuperator 18 is in fluid communication with the compressor outlet 36. The recuperator includes an inlet 42, coupled in fluid communication with the compressor outlet 36, and an outlet 44 that define one side of the heat exchanger of the recuperator 18. The recuperator also includes an inlet 46, coupled in fluid communication with the expander 26 to receive expanded supercritical fluid 16, and an outlet 48 that define another side of the heat exchanger of the recuperator 18. Heat is transferred to compressed supercritical fluid 16 flowing between the inlet 42 and the outlet 44 on one side of the heat exchanger from expanded supercritical fluid 16 flowing between the inlet 46 and the outlet 48 on the other side of the heat exchanger.

The outlet path 20 is structured to provide heated compressed supercritical fluid 16 from the recuperator 18 to a heat source, such as the thermal input module 22. The outlet path 20 includes a suitable isolation valve 21. The heat source, such as the thermal input module 22, suitably heats supercritical fluid provided thereto from the outlet path 20. The inlet path 24 is structured to provide heated compressed supercritical fluid 16 from the heat source 22. The inlet path 24 includes a suitable isolation valve 25.

Figure 2:
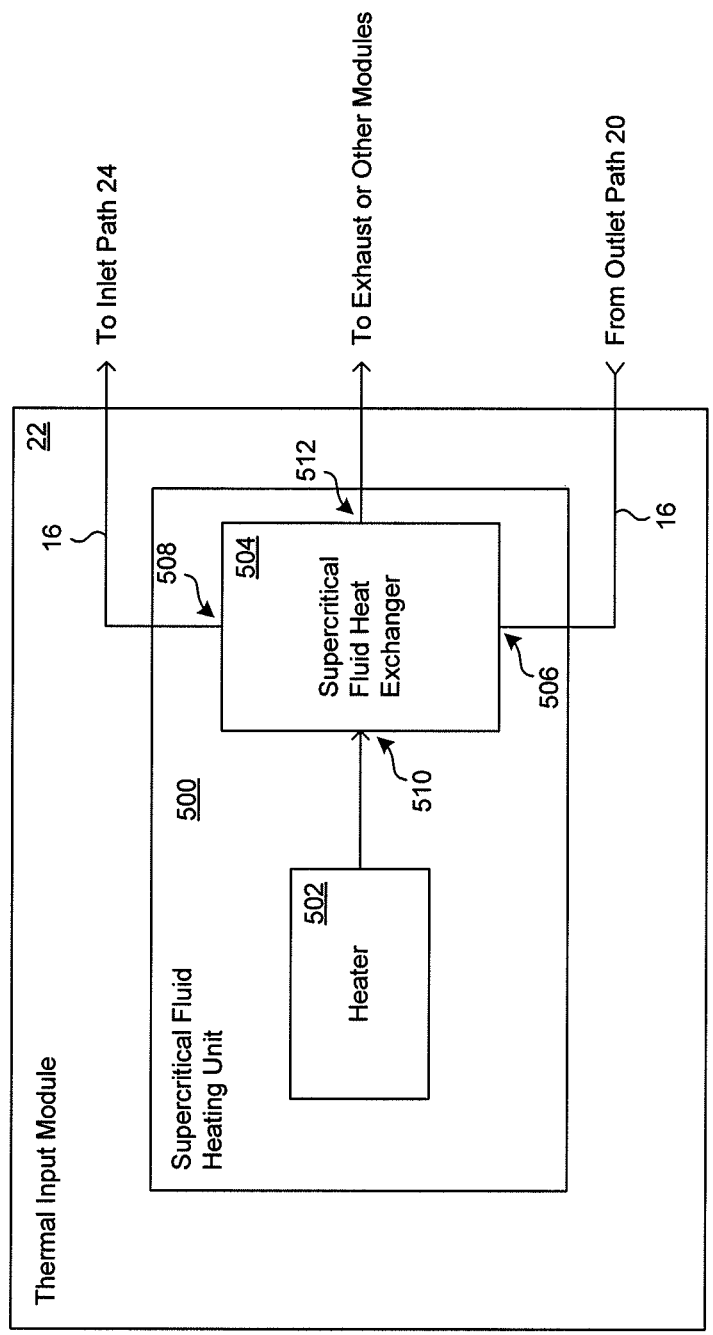
FIG. 2 is a schematic illustration of an illustrative embodiment of a thermal input module.

Further illustrative, non-limiting details of the thermal input module 22 are set forth referring additionally to FIG. 2. The thermal input module 22 includes a supercritical fluid heating unit 500. The supercritical fluid heating unit 500 suitably generates or collects heat and transfers the heat to the supercritical fluid 16.

The supercritical fluid heating unit 500 includes a heater 502 and a supercritical fluid heat exchanger 504. The heater 502 generates or collects heat. In some embodiments, the heater 502 may collect (and/or concentrate) heat from other sources of heat, such as without limitation geothermal, solar, process heat, waste heat, or the like. In some other embodiments, the heater 502 may generate heat, such as via oxidation or combustion or the like.

The supercritical fluid heat exchanger 504 is operationally coupled in thermal communication with the heater 502 and transfers the heat from the heater 502 to the supercritical fluid 16. The supercritical fluid heat exchanger 504 suitably is any type of heat exchanger, such as a tube-and-shell heat exchanger, a printed circuit heat exchanger, or the like. The supercritical fluid heat exchanger 504 may be implemented using any suitable flow orientation as desired, such as a cross-flow orientation, a counter-flow orientation, or a parallel-flow orientation. The supercritical fluid heat exchanger 504 suitably is sized to have a selected heat transfer capacity as desired for a particular application.

One side of the supercritical fluid heat exchanger 504 has an inlet 506 that may be coupled in fluid communication to receive supercritical fluid 16 from the outlet path 20 and an outlet 508 that may be coupled in fluid communication to provide heated supercritical fluid 16 to the inlet path 24.

Another side of the supercritical fluid heat exchanger 504 has an inlet 510 coupled to receive heat from the heater 502 and an outlet 512. The outlet 512 can exhaust to ambient or can be coupled to any other suitable module or modules as desired to supply waste thereto.

It will be appreciated that various embodiments of the thermal input module 22 may include more than one heater 502. In such embodiments, the heaters 502 may be different sources or collectors/concentrators of heat, discussed above, that may be combined with each other. Also, it will be appreciated that various embodiments of the thermal input module 22 may include more than one supercritical fluid heat exchanger 504, as desired for a particular application.

Referring back to FIG. 1, the expander 26 is coupled to receive heated compressed supercritical fluid 16 from the heat source, such as the thermal input module 22, and is structured to convert a drop in enthalpy of the supercritical fluid 16 to mechanical energy, such as without limitation rotation of the shaft 38. The expander 26 suitably may include any suitable device capable of expanding the heat supercritical fluid 16 received from the inlet path 24 and converting a drop in enthalpy of the supercritical fluid 16 to mechanical energy. As such, in some embodiments the expander 26 suitably may include without limitation a turbine or turbomachinery, such as without limitation a turbo-expander, an expansion turbine, a centrifugal turbine, an axial flow turbine, and/or the like. In such embodiments, the expander 26 causes the shaft 38 to rotate at very high rotational velocities, such as without limitation rotational velocities much greater than 3600 revolutions per minute. In some other embodiments, the expander 26 suitably may also include a reciprocating engine. It will be appreciated that, in some embodiments, more than one expander 26 may be provided, as desired for a particular application.

As shown in the embodiment of FIG. 1, the expander 26 has an inlet 49 operatively coupled in fluid communication with the inlet path 24 and an outlet 50 operatively coupled in fluid communication with the inlet 46 of the recuperator 18 to transfer heat from expanded supercritical fluid 16 to compressed supercritical fluid 16.

The electrical power generator 27 is operationally coupled to the expander 26 with the shaft 38. The electrical power generator 27 may be any suitable electrical power generator known in the art, such as a turbogenerator, an alternator, or any other suitable electrical power generator known in the art. The electrical power generator 27 may be sized to have an electrical power generating capacity as desired for a particular application. Also, it will be appreciated that, in some embodiments, more than one electrical power generator 27 may be provided, as desired for a particular application. Given by way of non-limiting example, depending on the particular application, in some embodiments the electrical power generator 27 (or all of the electrical power generators 27) may have a rating in a range between 2-6 $KW_e$. In some embodiments and given by way of non-limiting example, the electrical power generator 27 (or all of the electrical power generators 27) may have a rating on the order of around 5 $KW_e$ or so, as desired for a particular application. It will be appreciated that no limitation regarding rating of the electrical power generator 27 (or cumulative rating of all of the electrical power generators 27) is intended and is not to be inferred.

The cooler 28 is structured to cool expanded supercritical fluid 16 from the recuperator 18 and provide cooled supercritical fluid 16 to the compressor 14. The cooler 28 has an inlet 52 that is operatively coupled in fluid communication to the outlet 48 of the recuperator 18 and an outlet 54 that is operatively coupled in fluid communication to the inlet 34 of the compressor 14. The cooler 28 may be any suitable cooler that is suitable for cooling the supercritical fluid 16. For example and given by way of illustration and not of limitation, in various embodiments the cooler 28 may include: a "wet" cooler, such as a condenser; a heat exchanger like a tube-and-shell heat exchanger or a printed circuit heat exchanger; or a "dry" cooler, such as a forced-air cooling "radiator" or the like.

Figure 3:
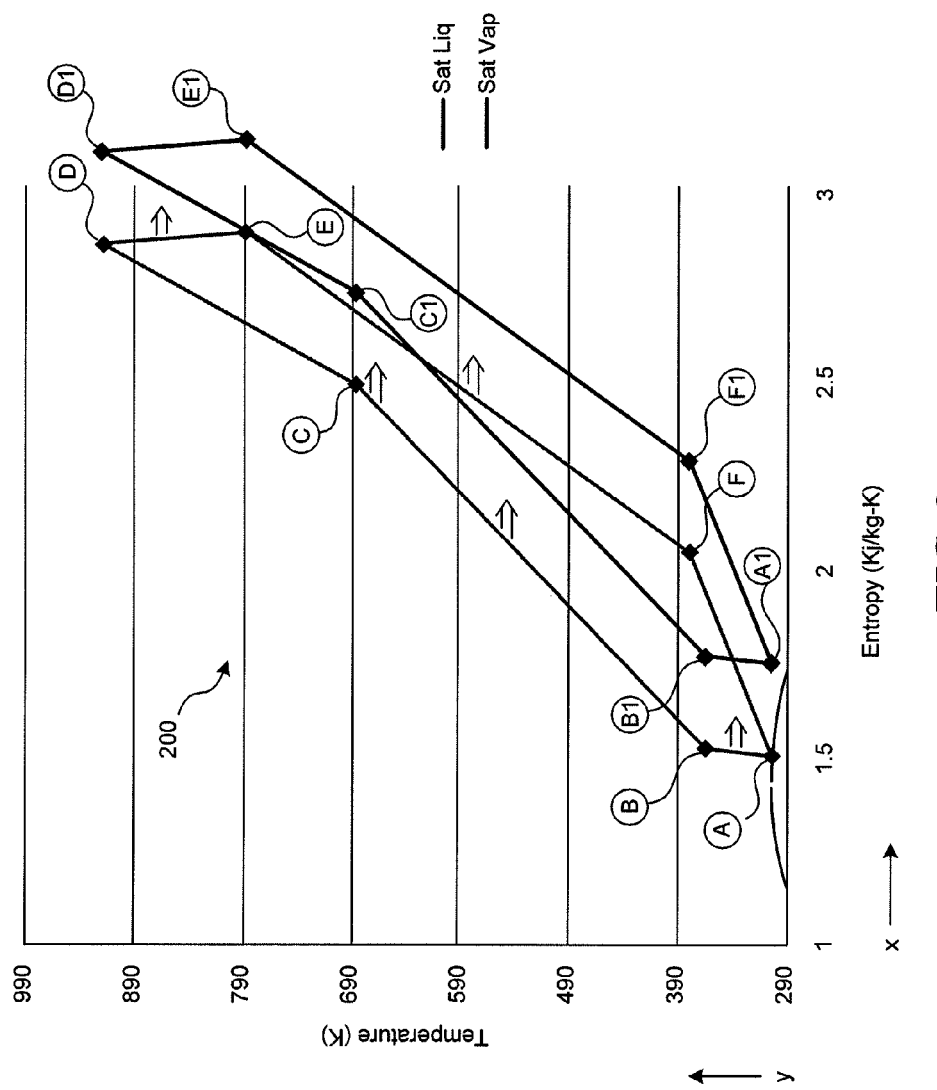
FIG. 3 is a graph of entropy versus temperature for a thermodynamic cycle implemented by the electrical power generating system of FIG. 1.
Figure 9:
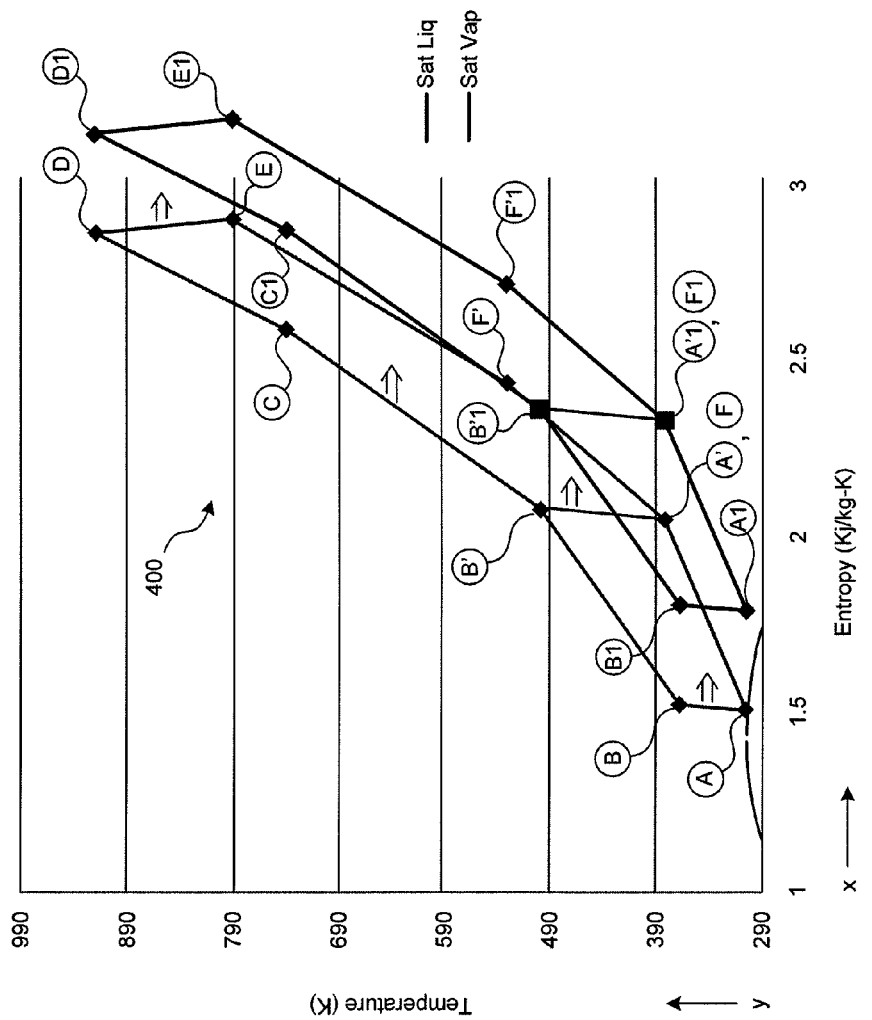
FIG. 9 is a graph of entropy versus temperature for a thermodynamic cycle implemented by the electrical power generating system of FIG. 8.
Figure 11:
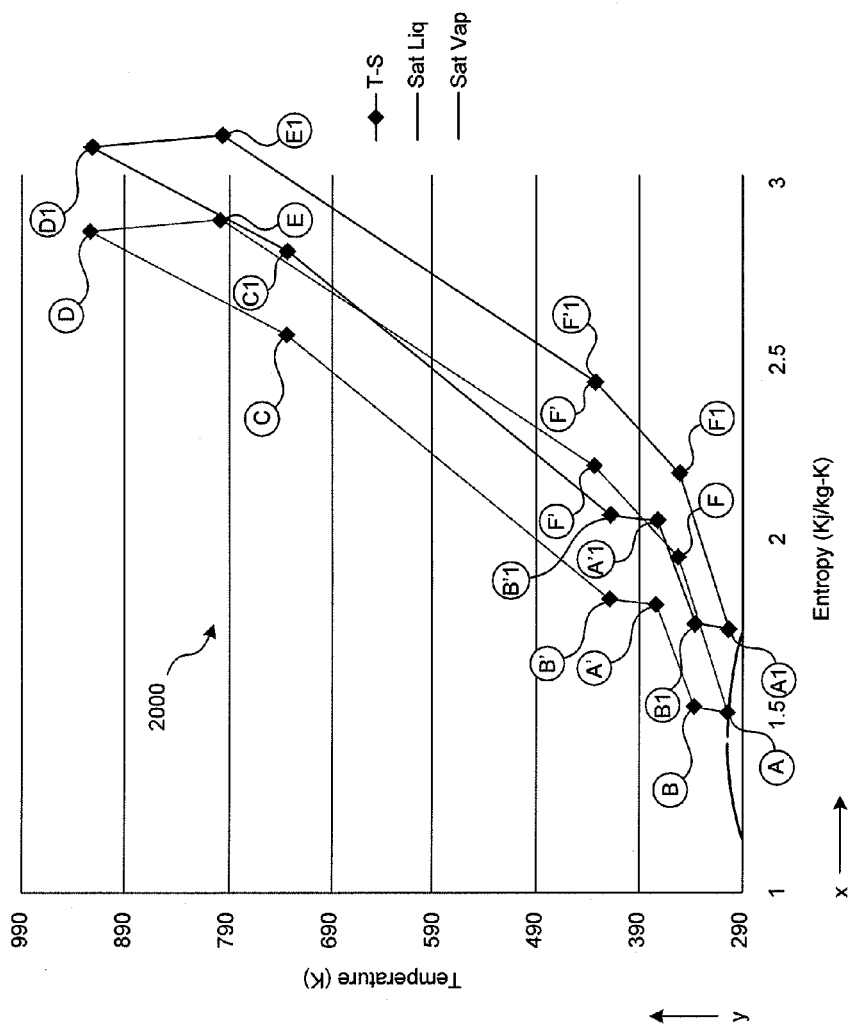
FIG. 11 is a graph of entropy versus temperature for a thermodynamic cycle implemented by the electrical power generating system of FIG. 8.
Figure 12:
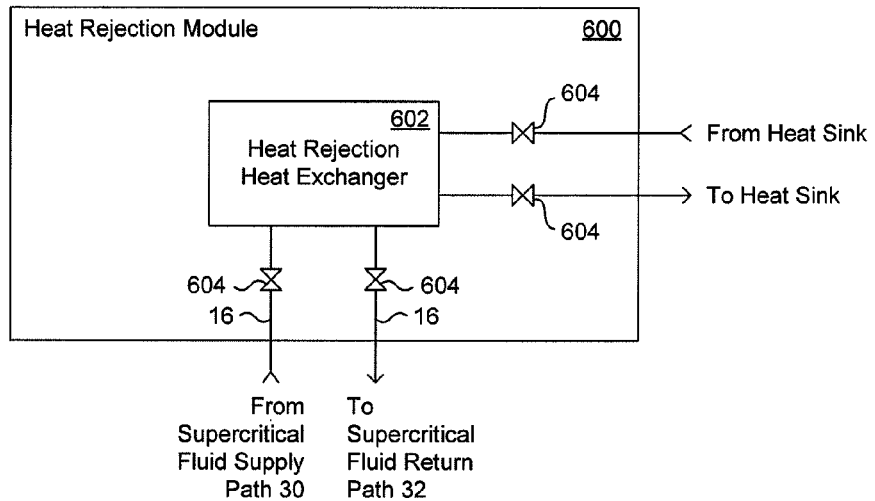
FIG. 12 is a schematic illustration of an illustrative embodiment of a heat rejection module.
Figure 13:
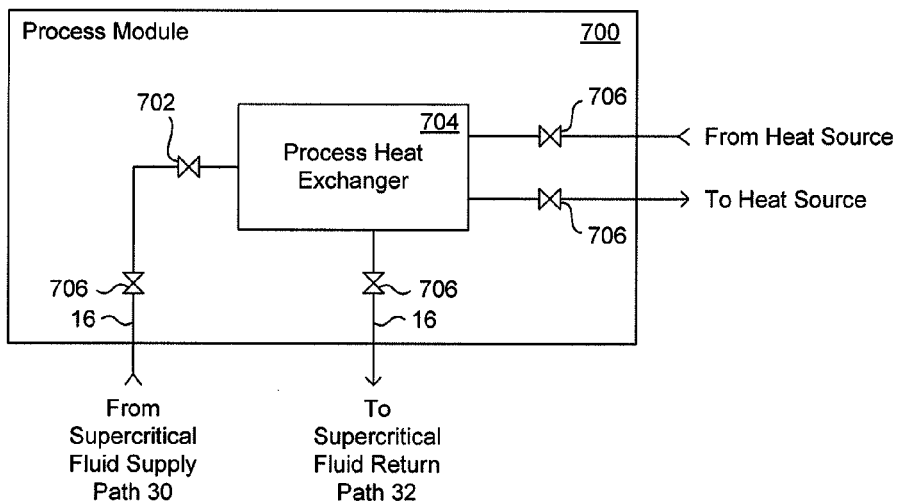
FIG. 13 is a schematic illustration of an illustrative embodiment of a process module.
Figure 14:
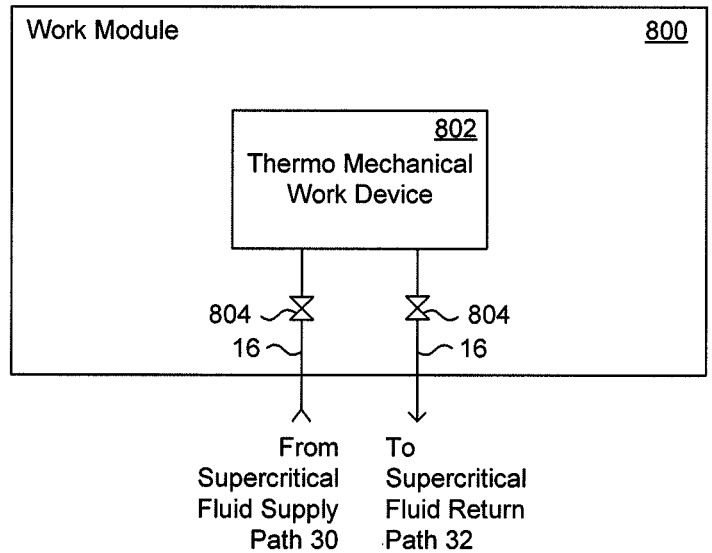
FIG. 14 is a schematic illustration of an illustrative embodiment of a work module.

Before embodiments of the part load control system 100 are explained, operation of embodiments of the electrical power generating system 9 will be discussed below with reference to FIG. 3. In FIGS. 3, 9, and 11, alphabetic indicators (e.g., A, B, C, etc. correspond to one set point, and alphanumeric indicators (e.g., A1, B1, C1, etc.) correspond to another set point Entropy (in Kj/kg-K) is graphed versus temperature (in degrees K) for a simple recuperated cycle, such as that implemented by the electrical power generating system 9. In the discussion below, phases of the thermodynamic cycle illustrated in FIG. 2 are mapped to corresponding components of the electrical power generating system 9 that may implement phases associated therewith. Alphabetic references (indicated in FIG. 1 and FIG. 3) are made to relate phases of the cycle illustrated in FIG. 3 to associated components illustrated in FIG. 1.

FIG. 3 graphs a curve 200 of entropy (in Kj/kg-K) along an x-axis versus temperature (in degrees K) along a y-axis. It will be appreciated that values for entropy and temperature are given by way of illustration only and not of limitation. It will be further appreciated that values of entropy and temperature may be affected by amounts of supercritical fluid 16 that may or may not be provided to other modules (not shown in FIGS. 1 and 3) in some embodiments of modular power infrastructure networks (discussed below) as desired for a particular purpose.

Referring now to FIGS. 1 and 3, between points A and B temperature of the supercritical fluid 16 is raised in a nearly substantially isentropic process as pressure of the supercritical fluid 16 is raised in the compressor 14 (approximating the well-known relationship PV=nRT). Between points B and C temperature and enthalpy of the supercritical fluid 16 are raised between the inlet 42 of the recuperator 18 and the outlet 44 of the recuperator 18. Between points C and D temperature of the supercritical fluid 16 is raised by the heat source, such as the thermal input module 22, between the outlet path 20 and the inlet path 24. Between points D and E temperature of the supercritical fluid 16 is lowered in a nearly substantially isentropic process as the supercritical fluid 16 is expanded, and the pressure thereof is reduced accordingly, in the expander 26. Between points E and F temperature and enthalpy of the supercritical fluid 16 are reduced between the inlet 46 of recuperator 18 and the outlet 48 of the recuperator 18. Between points F and A temperature and enthalpy of the supercritical fluid 16 are further reduced by the cooler 28.

It will be appreciated that, as seen in FIG. 3, in some embodiments the supercritical fluid 16 may remain in the supercritical state during all phases of the thermodynamic cycle shown in FIG. 3. However, it will be appreciated that, at one or more points during the process shown along the curve 200 a state other than a supercritical state may exist. Nonetheless, for sake of simplicity, reference is only made to the supercritical fluid 16 as opposed to a fluid having one or more properties other than that of a supercritical fluid.

A control system, suitably including the controller system 102, is provided in operative communication with components of the electrical power generating system 9 to monitor various parameters and provide feedback to control operation of the electrical power generating system 9. Part load control, however, will be explained later below. The control system may suitably monitor at least temperature, pressure, and flow rate at selected locations within the electrical power generating system 9 that correspond to the points A, B, C, D, E, and F (FIGS. 1 and 3). In some embodiments the control system also may suitably monitor speed of the shaft 38 and/or electrical load of the electrical generator 27. In some embodiments the control system may monitor heat flux in the thermal input module 22. The control system suitably compares monitored conditions to desired parameters, generates appropriate control signals, and controls the components of the modular power infrastructure network 10 to vary the speed of the shaft 38 (if desired), the compression ratio of the compressor 14, the amount of heat added by the thermal input module 22, and/or the like. The control system suitably may be implemented with any suitable controller like the controller system 102, such as without limitation any logic controller or the like, any suitable sensors (such as thermocouples, pressure sensors, flow rate sensors, rotational speed sensors, voltage sensors, current sensors, electrical power sensors, and/or heat flux sensors) and any suitable control actuators (such as without limitation throttle valves, rheostats, and the like).

Turning now to an embodiment of the part load control system 100 and given by way of illustration only and not of limitation, in some embodiments the part load control system 100 includes the controller system 102 configured to control compressor inlet 34 pressure responsive to a level of electrical power output requested of the electrical power generator 27 and the reservoir 104 with supercritical fluid 16, the reservoir 104 being operatively coupleable, responsive to the controller system 102, in fluid communication between the compressor outlet 36 and the expander inlet 49 and between the expander outlet 50 and the compressor inlet 34. As discussed above, average density of the supercritical fluid 16 advantageously can be adjusted up or down by changing the compressor inlet 34 pressure. Therefore, even though compressor-and-turbine shaft 38 speed may remain substantially constant, mass flow rate of supercritical fluid 16 through the closed loop may be controlled by changing the compressor inlet 34 pressure, thereby affecting the generated electrical power.

In various embodiments, sensors (not shown) are located throughout the electrical power generating system 9 and monitor parameters including: temperature (T) of supercritical fluid in the reservoir 104, between the compressor outlet 36 and the expander inlet 49, between the expander outlet 50 and the compressor inlet 34, and exit temperature of the heater 502 (FIG. 2); pressure (p) of supercritical fluid in the reservoir, between the compressor outlet and the expander inlet, and between the expander outlet and the compressor inlet; electrical power output requested from the electrical power generator 27; and actual electrical power output from the electrical power generator 27.

In various embodiments the controller system 102 includes a suitable computer processing component, such as without limitation a computer processing unit, a programmable logic component, a computer controller, or the like. Embodiments of the controller system 102 include a suitable computer processing component configured to correlate compressor inlet pressure with electrical power output requested of the electrical power generator. For example, in some embodiments the computer processing component may be configured to implement a look-up table having entries including compressor inlet pressure associated with electrical power output of the electrical power generator 27. In some other embodiments the computer processing component may be configured to implement a fit to compressor inlet pressure versus electrical power output requested of an electrical power generator. It will be appreciated that setpoints (discussed below) can be based on efficiency as well as electrical power and that pressure, temperature, and mass flow rate can be used to determine loop inventory for adjustments, as desired for a particular application.

In various embodiments, the reservoir 104 has supercritical fluid 16 therein and is operatively coupleable, responsive to the controller system 102, in fluid communication between the compressor outlet 36 and the expander inlet 49 (also referred to as a high pressure leg) and between the expander outlet 50 and the compressor inlet 34 (also referred to as a low pressure leg). The pressure of the reservoir 104 suitably is between the low pressure leg pressure and the high pressure leg pressure. As a result, as desired supercritical fluid 16 may be transferred from the reservoir 104 to the low pressure leg, thus adding supercritical fluid to the low pressure leg and adjusting up the average density of the supercritical fluid, which increases compressor inlet 34 pressure and increases electrical power generated by the electrical power generator. Alternately, as desired supercritical fluid 16 may be transferred from the high pressure leg to the reservoir 104, thus removing supercritical fluid from the high pressure leg and adjusting down the average density of the supercritical fluid, which decreases compressor inlet 34 pressure and decreases electrical power generated by the electrical power generator.

The pressure of the reservoir 104 suitably may be established and maintained between the low pressure leg pressure and the high pressure leg pressure over the desired range of part load control by selection of appropriate low pressure leg volume, high pressure leg volume, reservoir 104 volume, and total volume within the electrical power generating system 9. Given by way of non-limiting example, in various embodiments low pressure leg volume, high pressure leg volume, and reservoir 104 volume may all be around 1 m$^3$ each (appropriate for an electrical generator of around 5 MW$_e$) and low pressure leg pressure suitably may range between around 5,000 kPa and around 8,000 kPa, high pressure leg pressure suitably may range between 14,000 kPa to around 24,000 kPa, and reservoir 104 pressure suitably may range from between around 9,000 kPa to around 11,000 kPa, and total fill mass is around 500 kg.

In various embodiments an isolation valve 106 is disposed between the reservoir 104 and a piping component between the compressor outlet 36 and the expander inlet 49 (that is, the high pressure leg) and an isolation valve 108 is disposed between the reservoir 104 and a piping component between the expander outlet 50 and the compressor inlet 36 (that is, the low pressure leg). The isolation valves 106 and 108 may be any suitable type of isolation valve that may be actuated by the controller system 102. The isolation valves 106 and 108 are normally shut ("NS"). The isolation valves 106 and 108 suitably are operable responsive to the controller system 102. In some embodiments, the isolation valve 108 may be disposed between the reservoir 104 and a piping component coupled to the inlet 52 of the cooler 28, thereby mitigating perturbations that may be caused by small temperature and pressure fluctuations upon addition of supercritical fluid 16 to the low pressure leg from the reservoir 104 (due to possible expansion of the supercritical fluid 16 in the isolation valve 108).

In some embodiments the reservoir 104 may include a heat exchanger 110 disposed therein. The heat exchanger 104 suitably is operable responsive to the controller system 102 to control temperature of the supercritical fluid 16 in the reservoir 104. The heat exchanger 110 may be implemented with any suitable heat exchange device as desired for a particular application. For example, the heat exchanger 110 may include a piping or tubing loop or segment, a piping or tubing coil, or the like, through which a heating/cooling fluid may flow. For example, it may be desired to transfer heat from the supercritical fluid 16 in the reservoir 104 to fluid flowing through the heat exchanger 110 to cool the reservoir 104 to avoid inadvertent overheating of the reservoir 104. As another example, it may be desired to transfer heat from the fluid flowing through the heat exchanger 110 to the supercritical fluid 16 in the reservoir 104 to heat the reservoir 104 to help maintain a single phase supercritical fluid in the reservoir 104 to avoid condensation within the reservoir 104 which could have operational benefits during system startup.

Embodiments of the part load control system 100 operate as described below. The electrical power generating system 9 operates according to the thermodynamic cycle explained above with reference to FIG. 3 and the electrical power generator 27 generates electricity as described above. When it is desired to change an electrical power output level produced by the electrical power generator 27 (e.g., in response to a change in an electrical power demand placed on the power generator) from an actual electrical power output level (referred to as "set point A") to a different electrical power output level (referred to as "set point "B"), a suitable command will be generated within the control system and sent to the controller system 102 to change the net electrical power from set point A to set point B.

Figure 4:
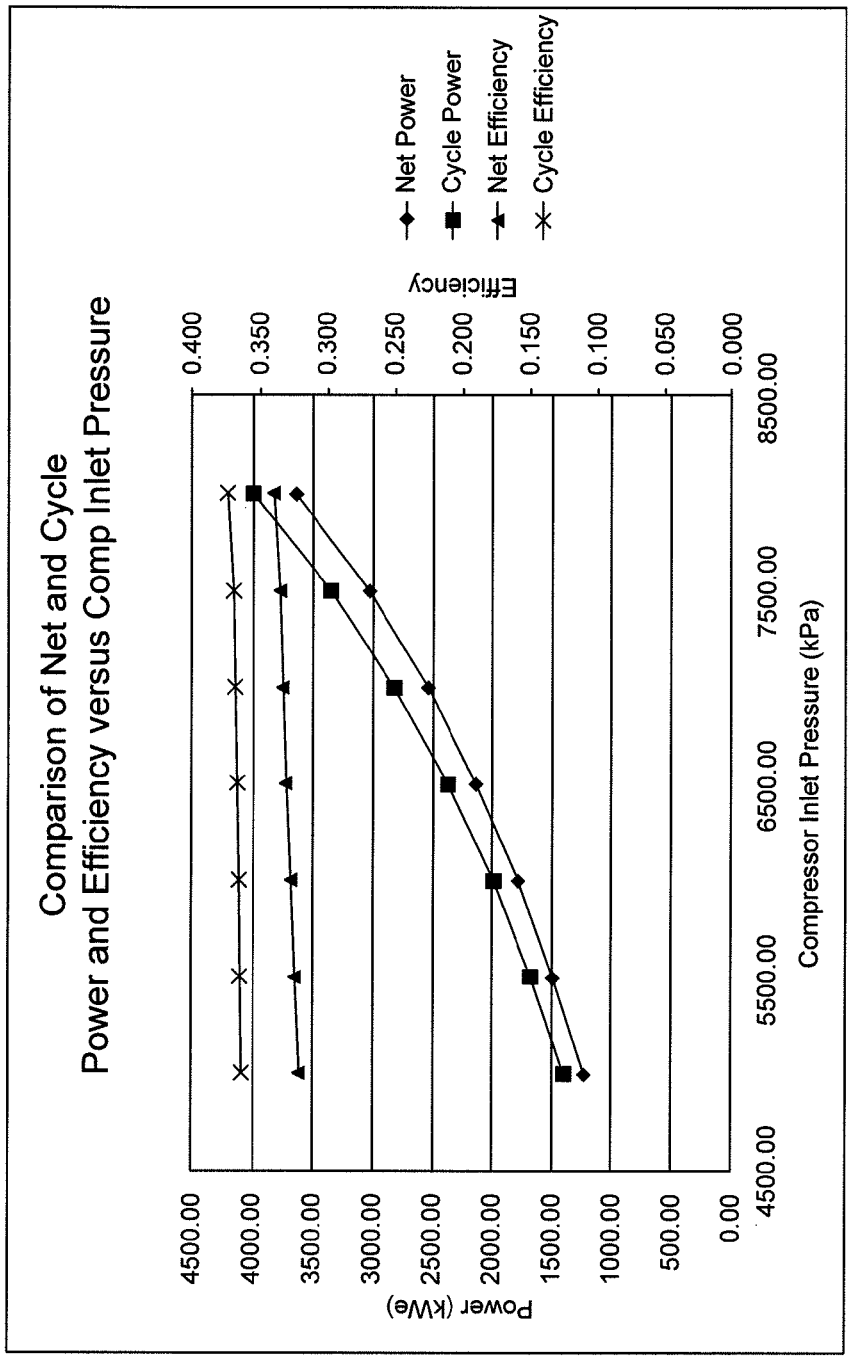
FIG. 4 graphs the relationship of electrical power and efficiency to loop pressure.

The inventory controller 102 will use a look up table or a fit (e.g., a curve fit) to net electric power versus compressor inlet pressure as shown in FIG. 4 to determine a new set point pressure B for compressor inlet 34 pressure. The relationship of electrical power and efficiency to loop pressure is demonstrated in FIG. 4. Referring additionally to FIG. 4 and given by way of illustrative example and not of limitation, when the compressor inlet 34 pressure (low pressure leg) is reduced to 5000 kPa from 8000 kPa (that is, a 33% pressure reduction), the net electrical power is decreased from 3645 kWe to 1233 kWe. Thus, a 33% reduction in pressure results in a factor of three decrease in electrical power. Also, it will be appreciated that net efficiency remains nearly constant over the full range of power variation. In this illustrative case, efficiency is reduced by only 2 percentage points from 34.1% to 32.1%. Thus, it will be appreciated that part load electrical power can be changed over a wide range with relatively small changes in compressor inlet 34 pressure and that net electrical efficiency can stay relatively constant. A suitable look-up table may be populated with entries of compressor inlet 34 pressure associated with electrical power output of the electrical power generator 27 such as those shown in FIG. 4. The values provided in the table may be determined via analytical prediction tools, testing, and/or both.

The isolation valves 106 and 108 are normally shut. If the new set point pressure B and power set point B are within the operating range of the part load control system 100, then the controller system 102 will send a suitable command to open either isolation valve 106 or isolation valve 108 to fill or drain supercritical fluid from the loop, as described below.

If the desired power at set point power B is below the current power, then the controller system 102 will cause the isolation valve 106 to open and the high pressure leg fills the reservoir 104 through the isolation valve 106. In this way, inventory (that is, supercritical fluid mass) in the loop is removed from the high pressure leg, thereby causing decreases in the compressor inlet 34 pressure, mass flow rate, and electric power generated by the electrical power generator 27. Likewise, if the set point power B exceeds the actual current power, the controller system 102 will cause isolation valve 108 to open, thereby adding supercritical fluid inventory to the loop from the reservoir 104 and thus increasing the compressor inlet 34 pressure and electrical power output from the electrical generator 27.

In some embodiments, the controller system 102 may implement a dead zone of +/−f % (such as a value between around 3%-5% or some other suitable value) around the set point power that may help the isolation valves 106 and 108 from being cycled at an excessive rate. This will allow the new power level to drift by +/−f % without opening or closing the isolation valves 106 or 108. Isolation valves 106 and 108 will be closed when the actual power is within +/−f % of the set point. When the actual power transitions to a value that is within +/−f % of the set point power (i.e. within the dead zone), the open isolation valve 106 or 108 will be closed. In some embodiments, a time delay may also be implemented to avoid rapid opening or closing of the isolation valves 106 and 108. In some embodiments, if desired a Proportional Integral Differential ("PID") feedback control may be used to slowly open or close the isolation valves 106 or 108 rather than the using the full open and full closed valve approached described above.

Figure 5:
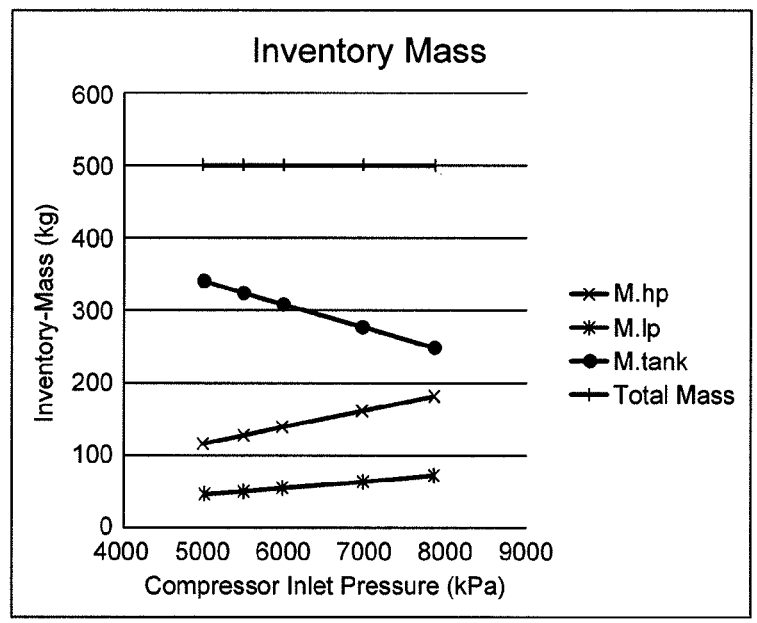
FIG. 5 graphs the relationship between inventory (of supercritical fluid) mass and compressor inlet pressure.

Details regarding the behavior of inventory mass and inventory pressure are set forth below. Referring additionally to FIG. 5, curves show the relationship between inventory (of supercritical fluid) mass (in the low pressure leg, reservoir 104, high pressure leg, and total loop) and compressor inlet 34 pressure. As shown in FIG. 5, removing mass from the reservoir 104 and putting it in the loop (via the low pressure leg) increases the low pressure leg mass and the high pressure leg mass and pressure which, in turn, increases the generated electrical power. It will be appreciated that the total loop inventory is constant (at 500 kg for this non-limiting example) regardless of the compressor inlet 34 pressure or part load power generated. It will be appreciated that total fill mass may have any suitable value as desired for a particular application. Given by way of non-limiting example, an embodiment may have a total fill mass of around 500 kg. In some embodiments, total system fill mass may be within a range from a minimum fill mass of around 447 kg to a maximum fill mass of around 780 kg.

Figure 6:
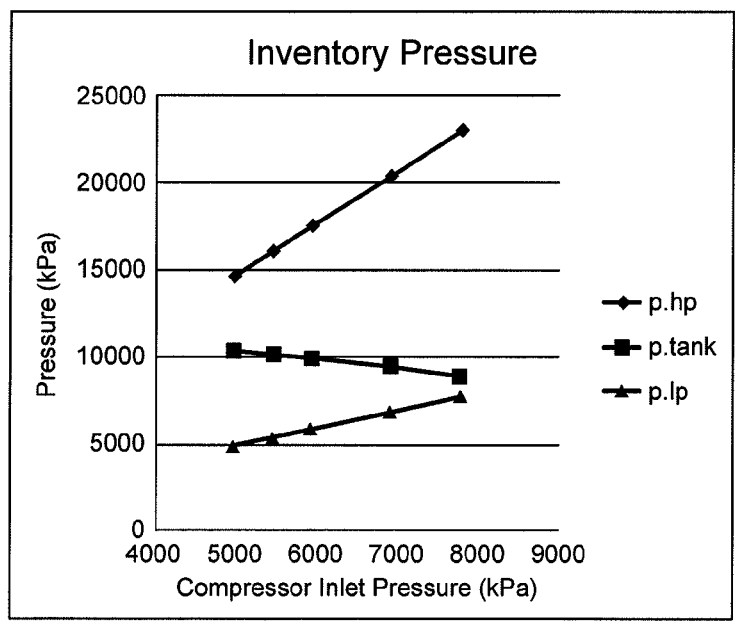
FIG. 6 graphs the relationship between pressure in the low pressure leg, reservoir (tank), and high pressure leg and compressor inlet pressure.

Referring additionally to FIG. 6, curves show the relationship between pressure in the low pressure leg, reservoir 104, and high pressure leg and compressor inlet 34 pressure. It will be appreciated from FIG. 6 that the volume of the high pressure leg, low pressure leg, the reservoir 104, and the total volume may be selected such that over the operating range of the part load control system 100 the reservoir 104 pressure is between the high pressure leg pressure and the low pressure leg pressure. As a result, the part load control system 100 can either add or remove supercritical fluid from the loop over the entire designed part load power range.

As shown in FIG. 6, in an embodiment in which the minimum fill mass is approximately 447 kg, even when the fill mass is 500 kg the reservoir 104 (tank) pressure line for a compressor inlet pressure at 8000 kPa nearly intersects the low pressure leg line at 8000 kPa. In general, it is desirable to pick a total fill inventory that keeps the pressure in the reservoir 104 as low as possible, because higher reservoir 104 pressures entail larger, more massive, and more expensive tanks.

Similarly, in an embodiment in which the maximum total system fill mass is about 780 kg, at 780 kg the reservoir 104 (tank) pressure line slides up and will intersect the high pressure leg pressure line if the fill mass is too large (in this non-limiting example, greater than 780 kg). Thus, changing the total fill inventory has the effect of sliding the reservoir 104 (tank) pressure line up and down. It will be appreciated that it is desirable that the reservoir 104 (tank) pressure line not intersect either the low pressure leg pressure line or the high pressure leg pressure line.

By suitable selection of volumes of the high pressure leg, the low pressure leg, the volume of the reservoir 104, and total fill mass of supercritical fluid 16, it is possible to arrange that the reservoir 104 pressure may be greater than the low pressure leg pressure and that the reservoir 104 pressure may be less than the high pressure leg pressure. It will be appreciated that, in this manner, levels of electrical power generated by the electrical generator 27 may be transitioned relatively smoothly from a minimum design value to a maximum design value by adjusting compressor inlet 34 pressure according to the relationship shown in FIG. 4. It will also be appreciated that increasing/decreasing the compressor inlet 34 pressure can also cause increases/decreases in all other loop pressures.

Figure 7:
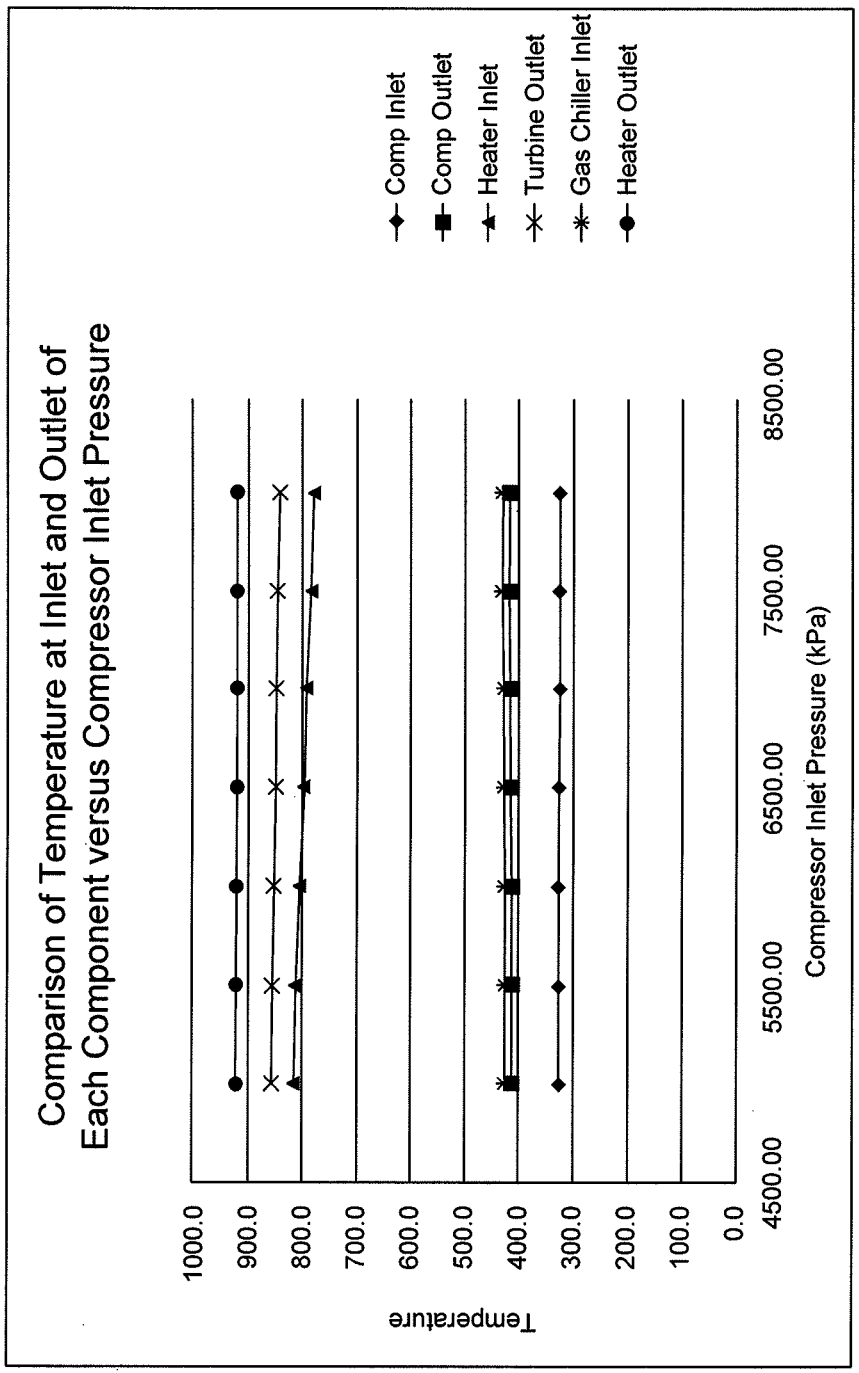
FIG. 7 graphs inlet and outlet temperatures of all components of the electrical power generating system as a function of inventory loop pressure at the compressor inlet.

Referring additionally to FIG. 7, it will be appreciated that component inlet and outlet temperatures do not change substantially with part load power variations. FIG. 7 shows inlet and outlet temperatures of all components of the electrical power generating system 9 as a function of inventory loop pressure at the compressor inlet 34. As illustrated, the temperature changes are very small and are on the order of up to 30-40 K (rather than hundreds of degrees, which is what would normally be observed if part load power changes were obtained by changing the heater exit temperature or by using compressor speed variations in a power take-off scheme where the turbine and generator spin at constant shaft speed, but the compressor can spin at a different speed). The small swings in temperature over the full range of power can help contribute to longer life of the major thermal components (primary heat exchangers, the recuperator 18, and the cooler 28) due to lower thermal cycling. Moreover, and referring additionally to FIG. 3, as the compressor inlet 34 pressure is reduced (in a non-limiting embodiment, from 8000 kPa to 5000 kPa) the overall power cycle as indicated by the T-S curve retains the same shape but is translated to the right (from point A to point A1), thereby allowing temperatures for all the components to remain very near their original (full power) temperatures.

Now that components and operation of embodiments of the part load control system 100 have been explained, it may be desirable to provide a modular power infrastructure network 10 that includes the electrical power generating system 9 (including the part load control system 100) and at least one other module that receives supercritical fluid from the supercritical power module 12 and returns the supercritical fluid thereto. In some such embodiments, at least one supercritical fluid supply path 30 is structured to supply supercritical fluid 16 from the supercritical power module 12. The supercritical fluid 16 that is supplied from the supercritical power module 12 may be expanded supercritical fluid 16 and/or compressed supercritical fluid 16, as desired for a particular application. The supercritical fluid 16 may be supplied from the supercritical power module 12 via the supercritical fluid supply path 30 to any other suitable module or modules (not shown in FIG. 1) in the modular power infrastructure network as desired for a particular application.

It may be desirable to provide supercritical fluid 16 at various temperatures and entropy levels from the supercritical power module 12 to one or more modules (not shown in FIG. 1) in the modular power infrastructure network as desired for a particular application. Accordingly, in various embodiments, the supercritical fluid supply paths 30 suitably may be provided at locations between one or more of the following components: the outlet 36 of the compressor 14 and the inlet 42 of the recuperator 18; the outlet 44 of the recuperator 18 and the isolation valve 21 in the outlet path 20; the isolation valve 25 in the inlet path 24 and the inlet 49 of the expander 48; the outlet 50 of the expander 26 and the inlet 46 of the recuperator 18; the outlet 48 of the recuperator 18 and the inlet 52 of the cooler 28; and the outlet 54 of the cooler 28 and the inlet 34 of the compressor 14. Each supercritical fluid supply path 30 is isolated via a suitable isolation valve 56.

In such embodiments, at least one supercritical fluid return path 32 is structured to return supercritical fluid 16 to the supercritical power module 12 from the other module or modules (not shown in FIG. 1) to which the supercritical fluid 16 has been supplied via the supercritical fluid supply path 30. Accordingly, in various embodiments, the supercritical fluid return paths 32 suitably may be provided at locations between one or more of the following components: the outlet 36 of the compressor 14 and the inlet 42 of the recuperator 18; the outlet 44 of the recuperator 18 and the isolation valve 21 in the outlet path 20; the isolation valve 25 in the inlet path 24 and the inlet 49 of the expander 48; the outlet 50 of the expander 26 and the inlet 46 of the recuperator 18; the outlet 48 of the recuperator 18 and the inlet 52 of the cooler 28; and the outlet 54 of the cooler 28 and the inlet 34 of the compressor 14. Each supercritical fluid return path 32 is isolated via a suitable isolation valve 58.

However, in other embodiments of the electrical power generating system 9 the supercritical power module 12 does not include any supercritical fluid supply path 30 or any supercritical fluid return path 32. Instead, the supercritical power module itself can include all the supercritical fluid it uses for operation.

In various embodiments the supercritical power module 12 suitably may be, but need not be, disposed within a modular, containerized platform (not shown in FIG. 1). Also if desired, various embodiments of the modular power infrastructure network 10 may also include, in addition to the supercritical power module 12 and the thermal input module 22, one or more other modules (not shown in FIG. 1) that may be connectable with various modules within the modular power infrastructure network 10 to help address various issues, such as without limitation various fueling options, different operating environments, heating and cooling needs, mechanical work requirements, siting constraints, and/or efficiency needs, as desired for a particular application.

The components of the supercritical power module 12 discussed above suitably may be, but need not be, interconnected with piping, tubing, fittings, connectors, and the like appropriate for temperature and pressure conditions and for compatibility with the supercritical fluid 16 contained therein and flowing therethrough. In addition in some embodiments, if desired, connections between components of the supercritical power module 12 may be made with "quick disconnect"-type fittings, thereby helping contribute to modularity of the supercritical power module 12. Moreover, in some embodiments, physical arrangement of components of the supercritical power module 12 may be standardized. That is, a set amount of space may be allocated for a particular component and a standard mounting pad or the like may be utilized for that particular component regardless of size or rating of the particular component, thereby also helping contribute to modularity of the supercritical power module 12.

In some embodiments, if desired connections between the supercritical power module 12 and other modules, such as those at terminations of the outlet path 20, the inlet path 24, the supercritical fluid supply path 30, and the supercritical fluid return path 32 may be made with "quick disconnect"-type fittings, thereby helping contribute to modularity of the modular power infrastructure network 10.

In some embodiments, the supercritical power module 12 may be, but need not be, implemented in one or more standard containers, such as an ocean-going cargo container or the like, thereby helping contribute to modularity of the modular power infrastructure network 10. Moreover, a standard container may be considered to include any such container shipped via road, truck, train, airlift, or water-going vessel.

Before discussing further modules that may be included in other embodiments of modular power infrastructure networks, as desired, another thermodynamic cycle that may be implemented by embodiments of the electrical power generating system 9 will be discussed. As will be appreciated, the other modules may be included in any embodiment of a modular power infrastructure network, as desired, regardless of thermodynamic cycle implemented within the electrical power generating system 9.

Recompression Brayton Cycle

Figure 8:
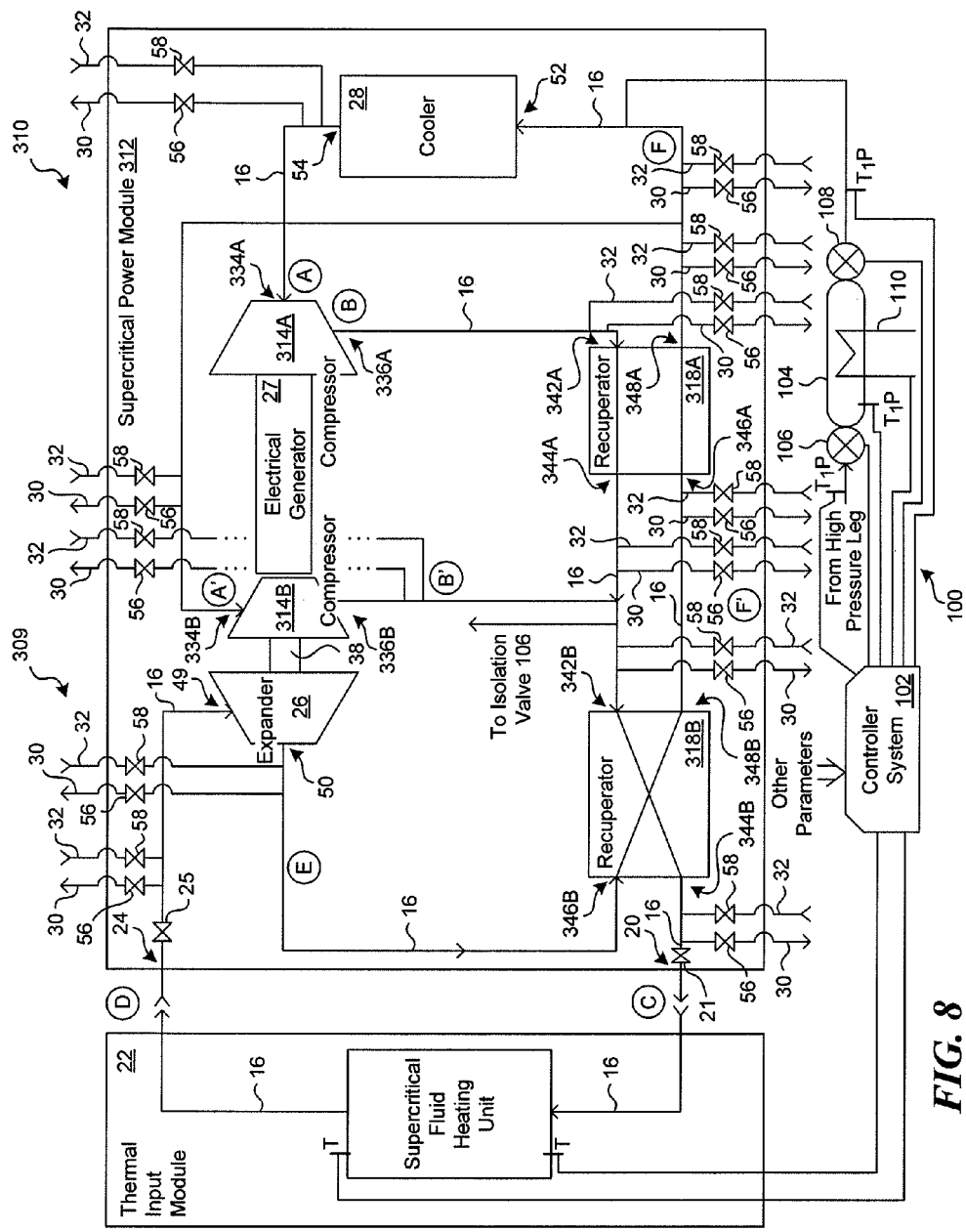
FIG. 8 is a schematic illustration of another illustrative embodiment of an electrical power generating system.

Referring now to FIGS. 8 and 9, in another embodiment an illustrative electrical power generating system 309 suitably implements a recompression Brayton cycle. It will be appreciated that the electrical power generating system 309 and the electrical power generating system 9 (FIG. 1) share many common components that have been discussed above. For sake of brevity, details regarding components that are common to the electrical power generating system 309 and the electrical power generating system 9 (FIG. 1) will not be repeated. The same reference numbers will be used to refer to components that are common to the electrical power generating system 309 and the electrical power generating system 9 (FIG. 1).

In an illustrative embodiment, the electrical power generating system 309 suitably implements a recompression Brayton cycle. Given by way of overview, a compressor 314A is structured to compress the supercritical fluid 16. A recuperator 318A is structured to heat compressed supercritical fluid 16 from the compressor 314A. A compressor 314B is structured to compress the supercritical fluid 16 in parallel with the compressor 314A. A recuperator 318B is structured to heat compressed supercritical fluid 16 from the compressor 314A and the compressor 314B. The outlet path 20 is structured to provide heated compressed supercritical fluid 16 from the recuperator 318B to a heat source, such as the thermal input module 22. The inlet path 24 is structured to provide heated compressed supercritical fluid 16 from the heat source, such as the thermal input module 22. The expander 26 is coupled to receive heated compressed supercritical fluid 16 from the heat source and is structured to convert a drop in enthalpy of supercritical fluid 16 to mechanical energy. The electrical power generator 27 is operatively coupled to the expander 26. The cooler 28 is structured to cool expanded supercritical fluid 16 from the recuperator 318A and provide cooled supercritical fluid 16 to the compressor 314A. In some embodiments if desired, at least one supercritical fluid supply path 30 may be structured to supply supercritical fluid 16 from the supercritical power module 312 and at least one supercritical fluid return path 32 may be structured to return supercritical fluid 16 to the supercritical power module 312.

It will be appreciated that the compressor 314A and the compressor 314B may be the same as, or substantially similar to, the compressor 14 (FIG. 1), as desired for a particular application. The compressor 314A has an inlet 334A and an outlet 336A, and the compressor 314B has an inlet 334B and an outlet 336B. The compressor 314A and the compressor 314B suitably are operatively coupled to the expander 26 with the shaft 38 in the same manner as discussed above regarding the compressor 14 (FIG. 1).

It will also be appreciated that the recuperator 318A and the recuperator 318B may be the same as, or substantially similar to, the recuperator 18 (FIG. 1), as desired for a particular application. The recuperator 318A has an inlet 342A and an outlet 344A on one side of the heat exchanger of the recuperator 318A, and an inlet 346A and an outlet 348A on the other side of the heat exchanger of the recuperator 318A. The recuperator 318B has an inlet 342B and an outlet 344B on one side of the heat exchanger of the recuperator 318B, and an inlet 346B and an outlet 348B on the other side of the heat exchanger of the recuperator 318B.

The inlet 342A of the recuperator 318A is coupled in fluid communication with the outlet 336A of the compressor 314A. The inlet 342B of the recuperator 318B is coupled in fluid communication with the outlet 344A of the recuperator 318A and the outlet 336B of the compressor 314B. The outlet path 20 is coupled in fluid communication with the outlet 344B of the recuperator 318B. The outlet 50 of the expander 26 is coupled in fluid communication with the inlet 346B of the recuperator 318B. The outlet 348B of the recuperator 318B is coupled in fluid communication with the inlet 346A of the recuperator 318A.

The outlet 348A of the recuperator 318A is coupled in fluid communication with the inlet 52 of the cooler 28 and the inlet 334B of the compressor 314B. As such, the compressor 314A and the compressor 314B compress the supercritical fluid 16 in parallel. A ratio of flow of supercritical fluid 16 to the compressor 314A to flow of supercritical fluid 16 to the compressor 314B may be determined as desired for a particular application.

Other details regarding the electrical power generating system 309 (including the part load control system 100) are the same as those set forth above regarding the electrical power generating system 9 (FIG. 1) (including the part load control system 100) and need not be repeated for an understanding. It will be appreciated that, similar to the electrical power generating system 9 (FIG. 1), the electrical power generating system 309 may include more than one expander 26 and more than one electrical power generator 27, as desired for a particular application.

Now that the illustrative electrical power generating system 309 and its components have been discussed, operation of embodiments of the electrical power generating system 309 will be discussed below with reference to FIG. 9.

Referring additionally to FIG. 9, entropy (in Kj/kg-K) is graphed versus temperature (in degrees K) for a recompression cycle, such as that implemented by the electrical power generating system 309. In the discussion below, phases of the thermodynamic cycle illustrated in FIG. 9 are mapped to corresponding components of the electrical power generating system 309 that may implement phases associated therewith. Alphabetic references (indicated in FIG. 8 and FIG. 9) are made to relate phases of the cycle illustrated in FIG. 9 to associated components illustrated in FIG. 8.

FIG. 9 graphs a curve 400 of entropy (in Kj/kg-K) along an x-axis versus temperature (in degrees K) along a y-axis. It will be appreciated that values for entropy and temperature are given by way of illustration only and not of limitation. It will be further appreciated that values of entropy and temperature may be affected by amounts of supercritical fluid 16 that may or may not be provided to other modules (not shown in FIGS. 8 and 9) in the modular power infrastructure network as desired for a particular purpose.

Referring now to FIGS. 8 and 9, between points A and B and between points A' and B' temperature of the supercritical fluid 16 is raised in nearly substantially isentropic processes as pressure of the supercritical fluid 16 is raised in the compressor 314A and the compressor 314B, respectively (approximating the well-known relationship PV=nRT). Between points B and B' temperature and enthalpy of the supercritical fluid 16 are raised between the inlet 342A of the recuperator 318A and the outlet 344A of the recuperator 318A. Between points B' and C temperature and enthalpy of the supercritical fluid 16 are raised between the inlet 342B of the recuperator 318B and the outlet 344B of the recuperator 318B. Between points C and D temperature and enthalpy of the supercritical fluid 16 are raised by the heat source, such as the thermal input module 22, between the outlet path 20 and the inlet path 24. Between points D and E temperature and enthalpy of the supercritical fluid 16 are lowered in a nearly substantially isentropic process as the supercritical fluid 16 is expanded, and the pressure thereof is reduced accordingly, in the expander 26. Between points E and F' temperature and enthalphy of the supercritical fluid 16 are reduced between the inlet 346B of recuperator 318B and the outlet 348B of the recuperator 318B. Between points F' and F temperature and enthalphy of the supercritical fluid 16 are reduced between the inlet 346A of recuperator 318A and the outlet 348A of the recuperator 318A. Between points F and A temperature and enthalpy of the supercritical fluid 16 are further reduced by the cooler 28.

It will also be appreciated that, as seen in FIG. 9, in some embodiments the supercritical fluid 16 may remain in the supercritical state during all phases of the thermodynamic cycle shown in FIG. 9. However, it will be appreciated that, at one or more points during the process shown along the curve 400 a state other than a supercritical state may exist. Nonetheless, for sake of simplicity, reference is only made to the supercritical fluid 16 as opposed to a fluid having one or more properties other than that of a supercritical fluid.

Moreover, as the compressor inlet 334A and 334B pressure is reduced (in a non-limiting embodiment, from 8000 kPa to 5000 kPa) the overall power cycle as indicated by the T-S curve retains the same shape but is translated to the right (from point A to point A1), thereby allowing temperatures for all the components to remain very near their original (full power) temperatures.

Compressor Recuperation Brayton Cycle

Figure 10:
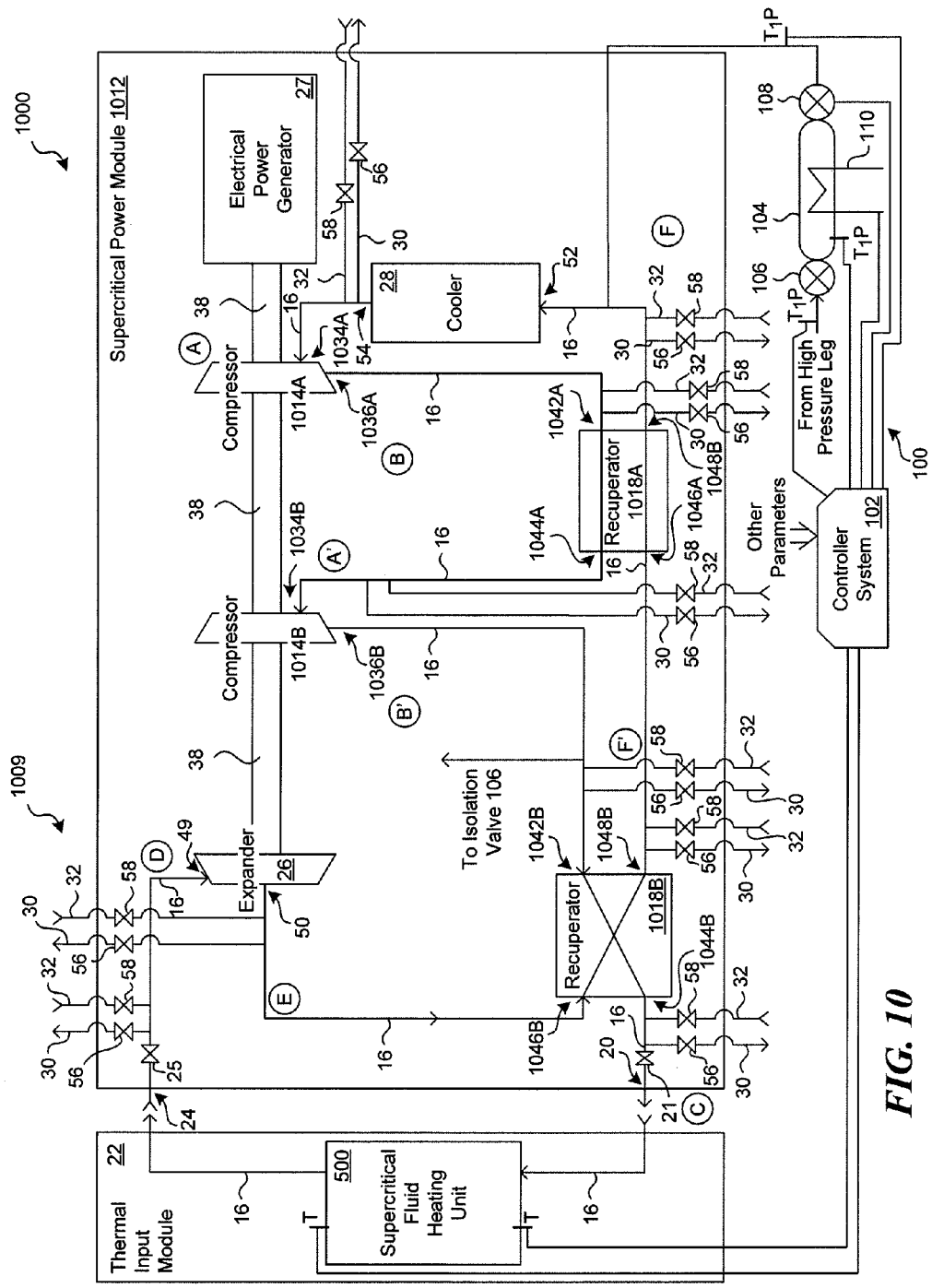
FIG. 10 is a schematic illustration of another illustrative embodiment of an electrical power generating system.

Referring now to FIGS. 10 and 11, in another embodiment an illustrative electrical power generating system 1009 suitably implements a compressor recuperation Brayton cycle. It will be appreciated that the electrical power generating system 1009 and the electrical power generating system 9 (FIG. 1) share many common components that have been discussed above. For sake of brevity, details regarding components that are common to the electrical power generating system 1009 and the electrical power generating system 9 (FIG. 1) will not be repeated. The same reference numbers will be used to refer to components that are common to the electrical power generating system 1009 and the electrical power generating system 9 (FIG. 1).

In an illustrative embodiment, the electrical power generating system 1009 suitably implements a compressor recuperation Brayton cycle. Given by way of overview, a compressor 1014A structured to compress supercritical fluid 16. A recuperator 1018A is structured to heat compressed supercritical fluid 16 from the compressor 1014A. A compressor 1014B is structured to compress heated supercritical fluid 16 received from the recuperator 1018A. A recuperator 1018B is structured to heat compressed supercritical fluid 16 from the compressor 1014B. An outlet path 20 is structured to provide heated compressed supercritical fluid 16 from the recuperator 1018B to a heat source, such as the thermal input module 22. The inlet path 24 is structured to provide heated compressed supercritical fluid 16 from the heat source, such as the thermal input module 22. The expander 26 is coupled to receive heated compressed supercritical fluid 16 from the heat source 22 and is structured to convert a drop in enthalpy of the supercritical fluid 16 to mechanical energy. The electrical power generator 27 is operatively coupled to the expander 26. The cooler 28 is structured to cool expanded supercritical fluid 16 from the recuperator 1018A and provide cooled supercritical fluid 16 to the compressor 1014A. In some embodiments if desired, at least one supercritical fluid supply path 30 may be structured to supply supercritical fluid 16 from the supercritical power module 1012 and at least one supercritical fluid return path 32 may be structured to return supercritical fluid 16 to the supercritical power module 1012.

It will be appreciated that the compressor 1014A and the compressor 1014B may be the same as, or substantially similar to, the compressor 14 (FIG. 1), as desired for a particular application. The compressor 1014A has an inlet 1034A and an outlet 1036A, and the compressor 1014B has an inlet 1034B and an outlet 1036B. The compressor 1014A and the compressor 1014B suitably are operatively coupled to the expander 26 with the shaft 38 in the same manner as discussed above regarding the compressor 14 (FIG. 1).

It will also be appreciated that the recuperator 1018A and the recuperator 1018B may be the same as, or substantially similar to, the recuperator 18 (FIG. 1), as desired for a particular application. The recuperator 1018A has an inlet 1042A and an outlet 1044A on one side of the heat exchanger of the recuperator 1018A, and an inlet 1046A and an outlet 1048A on the other side of the heat exchanger of the recuperator 1018A. The recuperator 1018B has an inlet 1042B and an outlet 1044B on one side of the heat exchanger of the recuperator 1018B, and an inlet 1046B and an outlet 1048B on the other side of the heat exchanger of the recuperator 1018B.

The inlet 1042A of the recuperator 1018A is coupled in fluid communication with the outlet 1036A of the compressor 1014A. The outlet 1044A of the recuperator 018A is coupled in fluid communication with the inlet 1034B of the compressor 1014B. The outlet 1036B of the compressor 1014B is coupled in fluid communication with the inlet 1042B of the recuperator 1018B. The outlet path 20 is coupled in fluid communication with the outlet 1044B of the recuperator 1018B. The outlet 50 of the expander 26 is coupled in fluid communication with the inlet 1046B of the recuperator 1018B. The outlet 1048B of the recuperator 1018B is coupled in fluid communication with the inlet 1046A of the recuperator 1018A.

The outlet 1048A of the recuperator 1018A is coupled in fluid communication with the inlet 52 of the cooler 28. As such, the compressor 1014A and the compressor 1014B compress the supercritical fluid 16 in series. The recuperator 1018A heats the supercritical fluid that exits the compressor 1014A and cools the expanded supercritical fluid that exits the outlet 1048B of the recuperator 1018B.

Other details regarding the electrical power generating system 1009 (including the part load control system 100) are the same as those set forth above regarding the electrical power generating system 9 (FIG. 1) (including the part load control system 100) and need not be repeated for an understanding. It will be appreciated that, similar to the electrical power generating system 9 (FIG. 1), the electrical power generating system 1009 may include more than one expander 26 and more than one electrical power generator 27, as desired for a particular application.

Now that the illustrative electrical power generating system 1009 and its components have been discussed, operation of embodiments of the electrical power generating system 1009 will be discussed below with reference to FIG. 9.

Referring additionally to FIG. 11, entropy (in Kj/kg-K) is graphed versus temperature (in degrees K) for a compressor recuperation cycle, such as that implemented by the electrical power generating system 1009. In the discussion below, phases of the thermodynamic cycle illustrated in FIG. 11 are mapped to corresponding components of the electrical power generating system 1009 that may implement phases associated therewith. Alphabetic references (indicated in FIG. 10 and FIG. 11) are made to relate phases of the cycle illustrated in FIG. 11 to associated components illustrated in FIG. 10.

FIG. 11 graphs a curve 2000 of entropy (in Kj/kg-K) along an x-axis versus temperature (in degrees K) along a y-axis. It will be appreciated that values for entropy and temperature are given by way of illustration only and not of limitation. It will be further appreciated that values of entropy and temperature may be affected by amounts of supercritical fluid 16 that may or may not be provided to other modules (not shown in FIGS. 10 and 11) in the modular power infrastructure network as desired for a particular purpose.

Referring now to FIGS. 10 and 11, between points A and B temperature of the supercritical fluid 16 is raised in a nearly substantially isentropic process as pressure of the supercritical fluid 16 is raised in the compressor 1014A (approximating the well-known relationship PV=nRT). Between points B and A' temperature and enthalpy of the supercritical fluid 16 are raised between the inlet 1042A of the recuperator 1018A and the outlet 1044A of the recuperator 1018A. Between points A' and B' temperature of the supercritical fluid 16 is raised in a nearly substantially isentropic process as pressure of the supercritical fluid 16 is raised in the compressor 1014B (approximating the well-known relationship PV=nRT). Between points B' and C temperature and enthalpy of the supercritical fluid 16 are raised between the inlet 1042B of the recuperator 1018B and the outlet 1044B of the recuperator 1018B. Between points C and D temperature and enthalpy of the supercritical fluid 16 are raised by the heat source, such as the thermal input module 22, between the outlet path 20 and the inlet path 24. Between points D and E temperature and enthalpy of the supercritical fluid 16 are lowered in a nearly substantially isentropic process as the supercritical fluid 16 is expanded, and the pressure thereof is reduced accordingly, in the expander 26. Between points E and F' temperature and enthalpy of the supercritical fluid 16 are reduced between the inlet 1046B of recuperator 1018B and the outlet 1048B of the recuperator 1018B. Between points F' and F temperature and enthalphy of the supercritical fluid 16 are reduced between the inlet 1046A of recuperator 1018A and the outlet 1048A of the recuperator 1018A. Between points F and A temperature and enthalpy of the supercritical fluid 16 are further reduced by the cooler 28.

It will be appreciated that, as seen in FIG. 11, in some embodiments the supercritical fluid 16 may remain in the supercritical state during all phases of the thermodynamic cycle shown in FIG. 11. However, it will be appreciated that, at one or more points during the process shown along the curve 2000 a state other than a supercritical state may exist. Nonetheless, for sake of simplicity, reference is only made to the supercritical fluid 16 as opposed to a fluid having one or more properties other than that of a supercritical fluid.

As discussed above, in various embodiments the recuperator 1018A transfers heat remaining in expanded (lower pressure) supercritical fluid 16 exiting the recuperator 1018B to higher pressure supercritical fluid 16 entering the compressor 1014B. Also, the recuperator 1018B transfers heat from the expanded supercritical fluid 16 to the supercritical fluid 16 exiting the compressor 1014B. Thus, temperature of the expanded supercritical fluid 16 that exits the recuperator 1018B is lowered (relative to simple recuperation) and temperature of compressed supercritical fluid 16 that enters the recuperator 1018B is raised. Relative to simple recuperation, these illustrative embodiments may help result in a lower average heat rejection temperature and greater amounts of recuperated heat, which can help increase the average heat addition temperature compared to a simple recuperated power cycle.

Moreover, as the compressor inlet 1034A pressure is reduced (in a non-limiting embodiment, from 8000 kPa to 5000 kPa) the overall power cycle as indicated by the T-S curve retains the same shape but is translated to the right (from point A to point A1), thereby allowing temperatures for all the components to remain very near their original (full power) temperatures.

Other Modules of Modular Power Infrastructure Networks

Now that illustrative thermodynamic cycles that may be implemented by embodiments of the supercritical power module have been discussed, further modules that may be included in embodiments of modular power infrastructure networks, as desired, will be discussed. As will be appreciated, the other modules may be included in any embodiment of a modular power infrastructure network, as desired, regardless of thermodynamic cycle implemented within the supercritical power module. The other modules described below can help configure different embodiments of modular power infrastructure networks to perform various functions, as desired. As will also be appreciated, the ability to reconfigure various embodiments of modular power infrastructure networks via inclusion of other modules as desired can help contribute to modularity of modular power infrastructure networks.

Referring now to FIGS. 1, 8, 10, and 12, various embodiments of modular power infrastructure networks may include one or more heat rejection modules 600. In such embodiments, the heat rejection module 600 allows transfer of heat from the supercritical fluid 16 supplied from embodiments of the supercritical power module (regardless of thermodynamic cycle implemented therein) to a heat sink (not shown) having a bulk temperature below that of the supercritical fluid 16 supplied to the heat rejection module 600. Given by way of non-limiting example, transfer of heat from the supercritical fluid 16 supplied from embodiments of the supercritical power module to the heat sink may be desirable to help increase efficiency of pumping or compression of the supercritical fluid 16. To that end, transfer of heat from the supercritical fluid 16 supplied from embodiments of the supercritical power module to the heat sink reduces enthalpy of the supercritical fluid 16, thereby increasing density of the supercritical fluid 16, which can help increase efficiency of pumping or compression of the supercritical fluid 16.

Embodiments of the heat rejection module 600 include at least one heat rejection heat exchanger 602. The heat rejection heat exchanger 602 may be any suitable type of heat exchanger as desired for a particular application. In some embodiments, it may be desired simply to transfer heat from the supercritical fluid 16 supplied from embodiments of the supercritical power module to the heat sink. In some such cases, the heat sink may be a reservoir like a large body of water (such as a lake, a river, an ocean, or the like) having a bulk temperature below that of the supercritical fluid 16 and the heat rejection heat exchanger 602 may be any acceptable heat exchanger such as a shell-and-tube heat exchanger, a printed circuit heat exchanger, or the like. In other such cases, the heat sink may be ambient air and the heat rejection heat exchanger 602 may be any acceptable heat exchanger structured to provide for evaporative cooling (such as, for example, a heat exchanger configured to spray a liquid onto cooling coils). In other such cases, the heat rejection heat exchanger 602 may be a radiator in which the heat sink is ambient air that is blown past coils through which the supercritical fluid 16 flows.

In some other embodiments, the heat sink may be a reservoir of fluid, having a bulk temperature below that of the supercritical fluid 16, to which it is desired to transfer heat from the supercritical fluid 16 and raise the bulk temperature for a desired purpose. In such cases and given by way of non-limiting examples, embodiments of the supercritical power module (regardless of thermodynamic cycle implemented therein) may be capable of providing heat otherwise unutilized therein to serve external systems requiring thermal input, such as without limitation district heating, residential heating, commercial heating, industrial heating, structural heating, process heating, or the like.

Each supply and return line to and from both sides of the heat rejection heat exchanger 602 may include an isolation valve 604. In some embodiments, if desired connections between the heat rejection module 600 and other modules, such as those at terminations of the supercritical fluid supply path 30 and the supercritical fluid return path 32, may be made with "quick disconnect"-type fittings, thereby helping contribute to modularity of the modular power infrastructure network. Also, if desired, in some embodiments the supercritical fluid 16 from the heat rejection heat exchanger 602 may be provided to any other suitable module for heating (and ultimate return to the supercritical fluid return path 32), as desired, instead of being returned directly to the supercritical fluid return path 32.

Referring now to FIGS. 1, 8, 10, and 13, various embodiments of modular power infrastructure networks may include one or more process modules 700. In such embodiments, the process module 700 allows transfer of heat from fluid supplied by a heat source (not shown) to the supercritical fluid 16 supplied from embodiments of the supercritical power module (regardless of thermodynamic cycle implemented therein), thereby cooling the fluid supplied by a heat source.

Embodiments of the process module 700 include at least one expansion device 702, such as without limitation an expansion valve or the like, and at least one process heat exchanger 704. The process heat exchanger 704 may be any suitable type of heat exchanger as desired for a particular application, such as a shell-and-tube heat exchanger, a printed circuit heat exchanger, or the like. The expansion device 702 expands the supercritical fluid 16, thereby lowering pressure and causing a drop in enthalpy (and a resultant drop in temperature). In the process heat exchanger 704 heat is transferred from fluid supplied by the heat source (and having a bulk temperature above that of the supercritical fluid 16 that has been expanded by the expansion device 702) to the supercritical fluid 16 that has been expanded by the expansion device 702.

The process module 700 may be used to provide cooling of fluid from any suitable heat source as desired for a particular application, such as without limitation computational facilities, HVAC system, process cooling, building and structure cooling, and the like.

Each supply and return line to and from both sides of the process heat exchanger 704 may include an isolation valve 706. In some embodiments, if desired connections between the process module 700 and other modules, such as those at terminations of the supercritical fluid supply path 30 and the supercritical fluid return path 32, may be made with "quick disconnect"-type fittings, thereby helping contribute to modularity of the modular power infrastructure network. Also, if desired, in some embodiments the supercritical fluid 16 from the process heat exchanger 704 may be provided to any other suitable module for cooling (and ultimate return to the supercritical fluid return path 32), as desired, instead of being returned directly to the supercritical fluid return path 32.

Referring now to FIGS. 1, 8, 10, and 14, various embodiments of modular power infrastructure networks may include one or more work modules 800. In such embodiments, the work module 800 includes at least one thermo mechanical work device 802 converts energy of the supercritical fluid 16 supplied from embodiments of the supercritical power module (regardless of thermodynamic cycle implemented therein) to mechanical work or electrical work, as desired for a particular application.

In some embodiments and given by way of non-limiting example, it may be desirable for the work module 800 to provide mechanical work in the form of rotational mechanical energy. In such embodiments, the thermo mechanical work device 802 may include an expander, such as a turbine, that expands the supercritical fluid 16 and converts a drop in enthalpy of the supercritical fluid 16 to rotational mechanical energy. Given by way of example and not of limitation, suitable turbines may include a turbo-expander, an expansion turbine, a centrifugal turbine, an axial flow turbine, and/or the like. Given by way of non-limiting example, in such cases the thermo mechanical work device 802 may rotationally drive a drill bit that is coupled to the thermo mechanical work device 802 (in this case, a turbine) with an appropriate shaft and any suitable gearing, as desired, for applications such as without limitation mining, construction, fossil fuel exploration, fossil fuel extraction, industrial or commercial applications, and the like. Given by way of another non-limiting example, the thermo mechanical work device 802 may rotationally drive an end effector, such as a buffer or the like, for industrial or commercial applications as desired. Regardless of whether rotational mechanical energy provided by the thermo mechanical work device 802 is used to rotationally drive any suitable mechanical work device attached thereto as discussed above, in some embodiments the thermo mechanical work device 802 may rotationally drive one or more suitable electrical power generators, thereby producing electricity as desired.

In some other embodiments and given by way of non-limiting example, it may be desirable for the work module 800 to provide mechanical work in the form of axial mechanical energy. In such embodiments, the thermo mechanical work device 802 may include an expander, such as a reciprocating engine, that expands the supercritical fluid 16 and converts a drop in enthalpy of the supercritical fluid 16 to axial mechanical energy. Given by way of non-limiting example, in such cases the thermo mechanical work device 802 may axially drive a hammer or a pile driver bit that is coupled to the thermo mechanical work device 802 (in this case, a reciprocating engine) with an appropriate, as desired, for applications such as without limitation mining, construction, fossil fuel exploration, fossil extraction, industrial or commercial applications, and the like. Regardless of whether axial mechanical energy provided by the thermo mechanical work device 802 is used to axially drive any suitable mechanical work device attached thereto as discussed above, in some embodiments the thermo mechanical work device 802 may axially drive one or more suitable electrical power generators, thereby producing electricity as desired.

In some embodiments, it may be desirable for the work module 800 to provide mechanical work in the form of rotational mechanical energy and axial mechanical energy. In such embodiments, at least one thermo mechanical work device 802 may include an expander, such as a turbine as discussed above, that expands the supercritical fluid 16 and converts a drop in enthalpy of the supercritical fluid 16 to rotational mechanical energy and an expander, such as a reciprocating engine, that expands the supercritical fluid 16 and converts a drop in enthalpy of the supercritical fluid 16 to axial mechanical energy. Given by way of example and not of limitation, such an illustrative thermo mechanical work device 802 (or thermo mechanical work devices 802) may be used to axially and rotationally drive a combination hammer/drill. Regardless of whether axial and rotational mechanical energy provided by the thermo mechanical work device 802 is used to axially drive any suitable mechanical work device attached thereto as discussed above, in some embodiments the thermo mechanical work device 802 may axially drive one or more suitable electrical power generators and/or may rotationally drive one or more suitable electrical power generators, thereby producing electricity as desired.

Regardless of whether or not the work module 800 provides any suitable mechanical work, in various embodiments one or more thermo mechanical work devices 802 may include one or more thermoelectric generators. In such cases, the thermoelectric generator converts heat from the supercritical fluid 16 directly into electrical energy, using a phenomenon called the "Seebeck effect" (or "thermoelectric effect").

Each supply and return line to and from the thermo mechanical work device 802 may include an isolation valve 804. In some embodiments, if desired connections between the work module 800 and other modules, such as those at terminations of the supercritical fluid supply path 30 and the supercritical fluid return path 32, may be made with "quick disconnect"-type fittings, thereby helping contribute to modularity of the modular power infrastructure network. Also, if desired, in some embodiments the supercritical fluid 16 from the thermo mechanical work device 802 may be provided to any other suitable module for heating, cooling, or conversion to work (and ultimate return to the supercritical fluid return path 32), as desired, instead of being returned directly to the supercritical fluid return path 32.

In various embodiments of modular power infrastructure networks, various modules may be combined as desired for a particular application. It will be appreciated that such combinations may be made regardless of thermodynamic cycle implemented by the supercritical power module.

Figure 15:
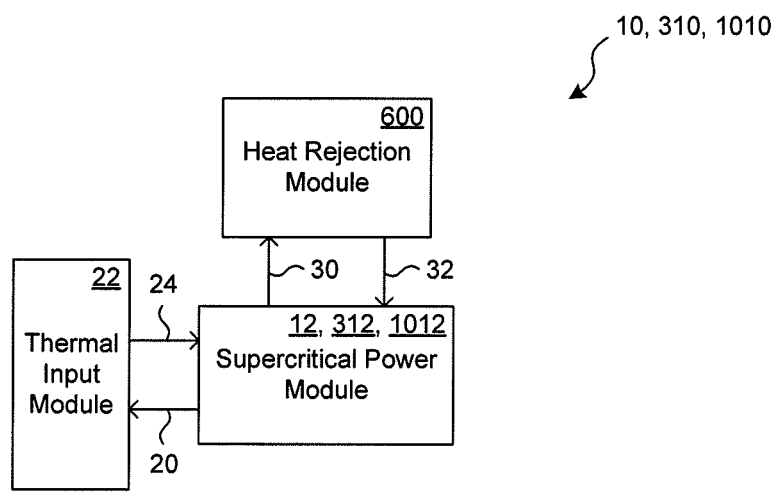
FIGS. 15-21 are schematic illustrations of illustrative embodiments of modular power infrastructure networks.

To that end, and referring now to FIG. 15, in some embodiments an illustrative modular power infrastructure network 10, 310, 1010 may include at least one supercritical power module 12, 312, 1012 at least one thermal input module 22 coupled in fluid communication with the at least one supercritical power module 12, 312 via the outlet path 20 and the inlet path 24, and at least one heat rejection module 600 coupled in fluid communication with the at least one supercritical power module 12, 312, 1012 via the supercritical fluid supply path 30 and the supercritical fluid return path 32. Such an embodiment may provide combined heating and power ("CHP"), as desired for a particular application.

Figure 16:
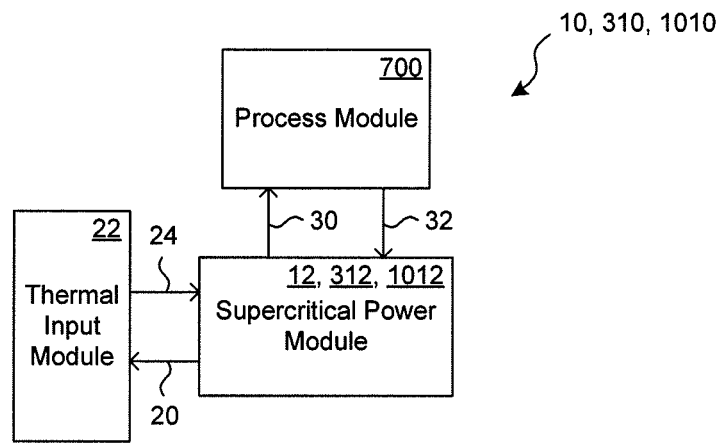

Referring now to FIG. 16, in some embodiments an illustrative modular power infrastructure network 10, 310, 1010 may include at least one supercritical power module 12, 312, 1012, at least one thermal input module 22 coupled in fluid communication with the at least one supercritical power module 12, 312, 1012 via the outlet path 20 and the inlet path 24, and at least one process module 700 coupled in fluid communication with the at least one supercritical power module 12, 312, 1012 via the supercritical fluid supply path 30 and the supercritical fluid return path 32. Such an embodiment may provide combined cooling and power ("CCP"), as desired for a particular application.

Figure 17:
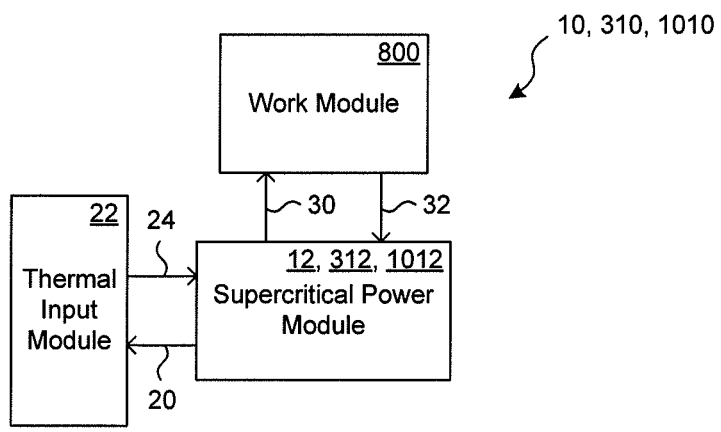

Referring now to FIG. 17, in some embodiments an illustrative modular power infrastructure network 10, 310, 1010 may include at least one supercritical power module 12, 312, 1012, at least one thermal input module 22 coupled in fluid communication with the at least one supercritical power module 12, 312, 1012 via the outlet path 20 and the inlet path 24, and at least one work module 800 coupled in fluid communication with the at least one supercritical power module 12, 312, 1012 via the supercritical fluid supply path 30 and the supercritical fluid return path 32.

Figure 18:
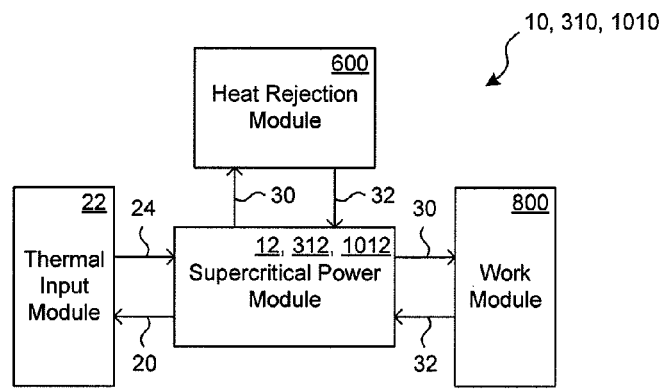

Referring now to FIG. 18, in some embodiments an illustrative modular power infrastructure network 10, 310, 1010 may include at least one supercritical power module 12, 312, 1012, at least one thermal input module 22 coupled in fluid communication with the at least one supercritical power module 12, 312, 1012 via the outlet path 20 and the inlet path 24, at least one heat rejection module 600 coupled in fluid communication with the at least one supercritical power module 12, 312, 1012 via the supercritical fluid supply path 30 and the supercritical fluid return path 32, and at least one work module 800 coupled in fluid communication with the at least one supercritical power module 12, 312, 1012 via the supercritical fluid supply path 30 and the supercritical fluid return path 32. Such an embodiment may provide CHP, as desired for a particular application.

Figure 19:
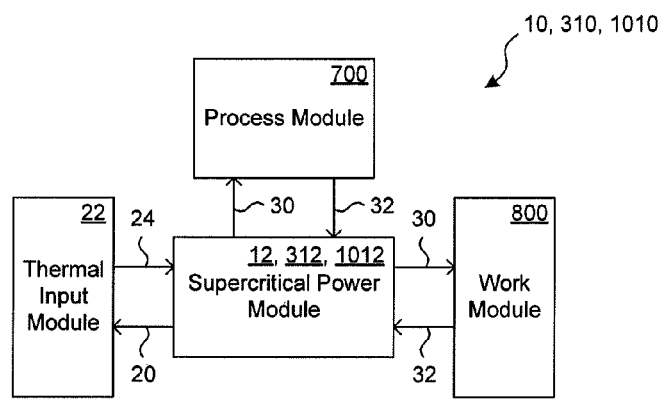

Referring now to FIG. 19, in some embodiments an illustrative modular power infrastructure network 10, 310, 1010 may include at least one supercritical power module 12, 312, 1012, at least one thermal input module 22 coupled in fluid communication with the at least one supercritical power module 12, 312, 1012 via the outlet path 20 and the inlet path 24, at least one process module 700 coupled in fluid communication with the at least one supercritical power module 12, 312, 1012 via the supercritical fluid supply path 30 and the supercritical fluid return path 32, and at least one work module 800 coupled in fluid communication with the at least one supercritical power module 12, 312, 1012 via the supercritical fluid supply path 30 and the supercritical fluid return path 32. Such an embodiment may provide CCP, as desired for a particular application.

Figure 20:
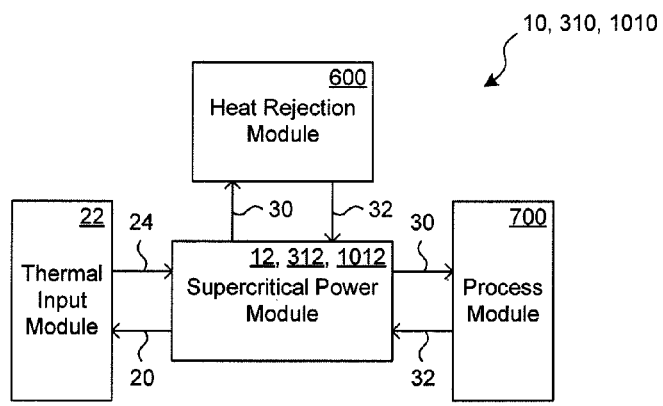

Referring now to FIG. 20, in some embodiments an illustrative modular power infrastructure network 10, 310, 1010 may include at least one supercritical power module 12, 312, 1012, at least one thermal input module 22 coupled in fluid communication with the at least one supercritical power module 12, 312, 1012 via the outlet path 20 and the inlet path 24, at least one heat rejection module 600 coupled in fluid communication with the at least one supercritical power module 12, 312, 1012 via the supercritical fluid supply path 30 and the supercritical fluid return path 32, and at least one process module 700 coupled in fluid communication with the at least one supercritical power module 12, 312, 1012 via the supercritical fluid supply path 30 and the supercritical fluid return path 32. Such an embodiment may provide combined heating, cooling, and power ("CHCP"), as desired for a particular application.

Figure 21:
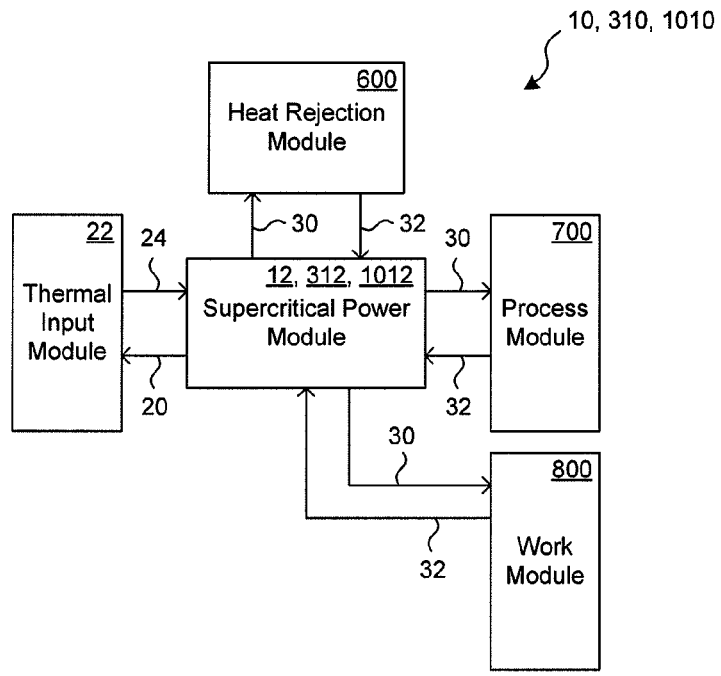

Referring now to FIG. 21, in some embodiments an illustrative modular power infrastructure network 10, 310, 1010 may include at least one supercritical power module 12, 312, 1012, at least one thermal input module 22 coupled in fluid communication with the at least one supercritical power module 12, 312, 1012 via the outlet path 20 and the inlet path 24, at least one heat rejection module 600 coupled in fluid communication with the at least one supercritical power module 12, 312, 1012 via the supercritical fluid supply path 30 and the supercritical fluid return path 32, at least one process module 700 coupled in fluid communication with the at least one supercritical power module 12, 312, 1012 via the supercritical fluid supply path 30 and the supercritical fluid return path 32, and at least one work module 800 coupled in fluid communication with the at least one supercritical power module 12, 312, 1012 via the supercritical fluid supply path 30 and the supercritical fluid return path 32. Such an embodiment may provide CHCP, as desired for a particular application.

Figure 22:
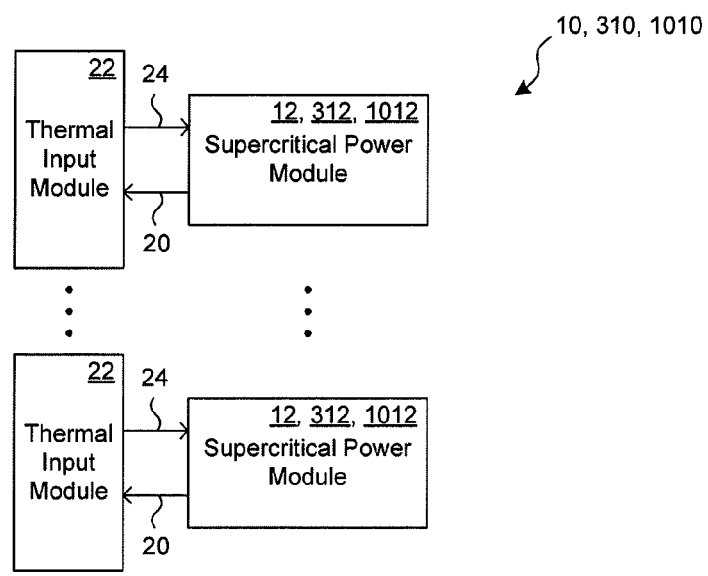
FIGS. 22-24 are schematic illustrations of illustrative embodiments of distributed electrical power infrastructure networks.
Figure 23:
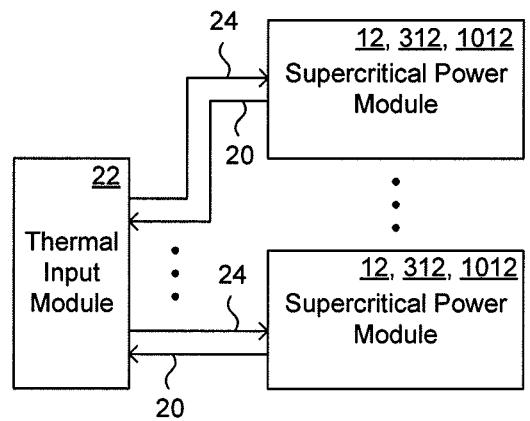
Figure 24:
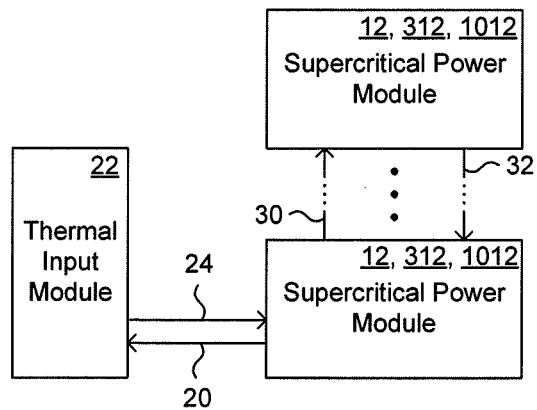

Referring now to FIGS. 22-24, it will be appreciated that embodiments of the modular power infrastructure network 10, 310, 1010 may provide for distributed electrical power generation and/or a distributed electrical power grid infrastructure (regardless of thermodynamic cycle implemented in any supercritical power module 10, 310, 1010) (collectively referred to herein as "distributed electrical power infrastructure networks"). Illustrative distributed electrical power infrastructure networks may include at least one thermal input module 22 and two or more supercritical power modules 10, 310, 1010 (regardless of thermodynamic cycle implemented therein) that each include at least one electrical power generator 27 (not shown in FIGS. 22-24). Embodiments of distributed electrical power infrastructure networks may generate and distribute electrical power for applications including without limitation grid-scale electrical utilities, local utilities, microgrids, computational facilities and equipment, motors, mines, military bases, remote power, transportation equipment, batteries, flywheels, and the like.

It will be appreciated that supercritical fluid may be heated and distributed as desired in various embodiments of distributed electrical power infrastructure networks. As a non-limiting example and as shown in FIG. 22, each thermal input module 22 may be coupled in fluid communication directly with an associated supercritical power module 10, 310, 1010 via outlet paths 20 and inlet paths 24. As another non-limiting example and as shown in FIG. 23, one thermal input module 22 may be coupled in fluid communication directly with more than one supercritical power module 10, 310, 1010 via outlet paths 20 and inlet paths 24. As another non-limiting example and as shown in FIG. 24, one thermal input module 22 may be coupled in fluid communication directly with one supercritical power module 10, 310, 1010 via outlet paths 20 and inlet paths 24, which in turn may be coupled in fluid communication directly with another supercritical power module 10, 310, 1010 via the supercritical fluid supply path 30 and the supercritical fluid return path 32. It will also be appreciated that, while not shown in FIGS. 22-24, embodiments of distributed electrical power infrastructure networks may include any one or more heat rejection module 600, process module 700, and/or work module 800 as desired for a particular application.

Illustrative Methods

Now that illustrative embodiments of electrical power generating systems, modular power infrastructure networks and distributed electrical power infrastructure networks have been discussed, illustrative methods will be discussed by way of non-limiting examples. Embodiments of the methods may be used in association with embodiments of the electrical power generating systems 9, 309, and 1009 disclosed above. Details of the electrical power generating systems 9, 309, and 1009 disclosed above have been set forth above, are incorporated by this reference, and need not be repeated for an understanding of embodiments of the illustrative methods.

Following are a series of flowcharts depicting representative implementations. For ease of understanding, the flowcharts are organized such that the initial flowcharts present implementations via an example implementation and thereafter the following flowcharts present other (e.g., alternate) implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 25A:
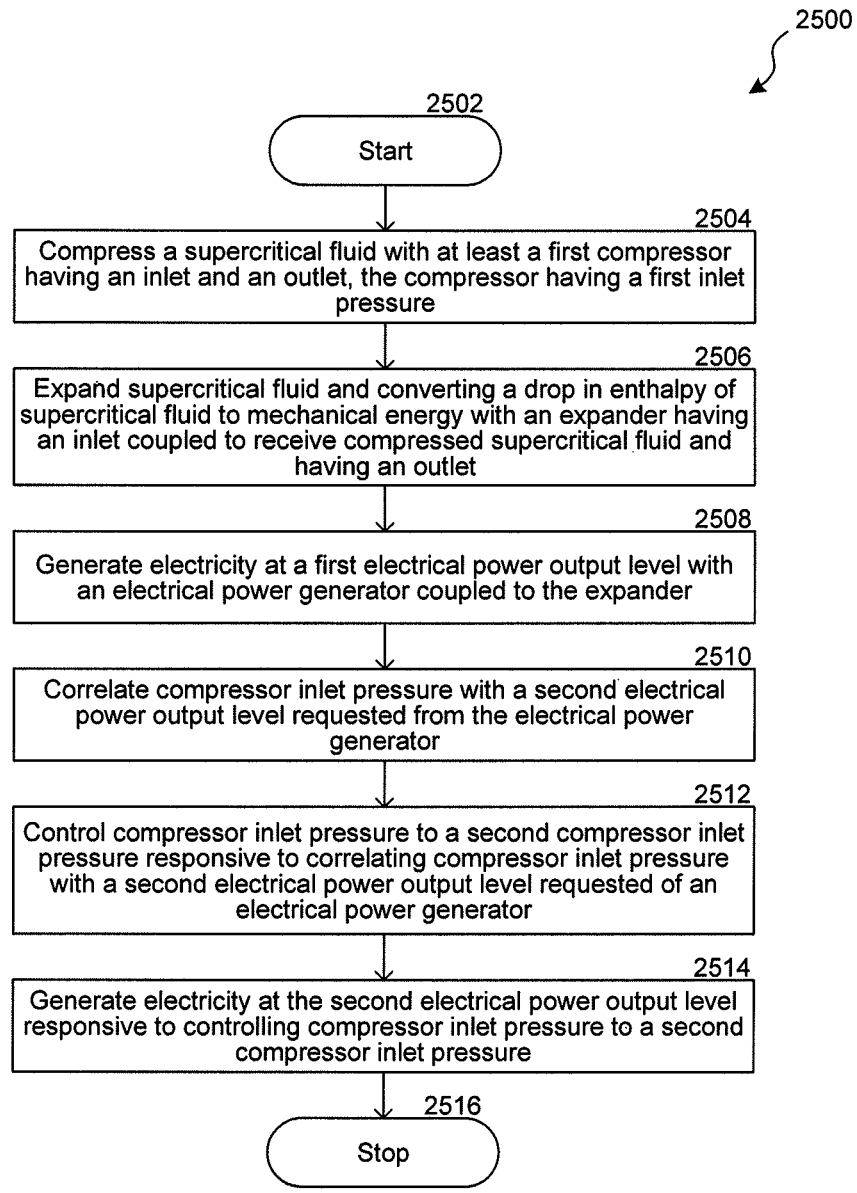
FIG. 25A is a flowchart of an illustrative method of controlling partial loading of an electrical power generator.

Referring now to FIG. 25A, in an embodiment an illustrative method 2500 is provided for controlling partial loading of an electrical power generator. The method 2500 starts at a block 2502. At a block 2504, a supercritical fluid is compressed with at least a first compressor having an inlet and an outlet, the compressor having a first inlet pressure. At a block 2506 supercritical fluid is expanded and a drop in enthalpy of supercritical fluid is converted to mechanical energy with an expander having an inlet coupled to receive compressed supercritical fluid and having an outlet. At a block 2508 electricity is generated at a first electrical power output level with an electrical power generator coupled to the expander. At a block 2510 compressor inlet pressure is correlated with a second electrical power output level requested of the electrical power generator. At a block 2512 compressor inlet pressure is controlled to a second compressor inlet pressure responsive to the established correlation between compressor inlet pressure and a second electrical power output level requested of an electrical power generator. At a block 2514 electricity is generated at the second electrical power output level responsive to controlling compressor inlet pressure to a second compressor inlet pressure. The method 2500 stops at a block 2516.

Figure 25B:
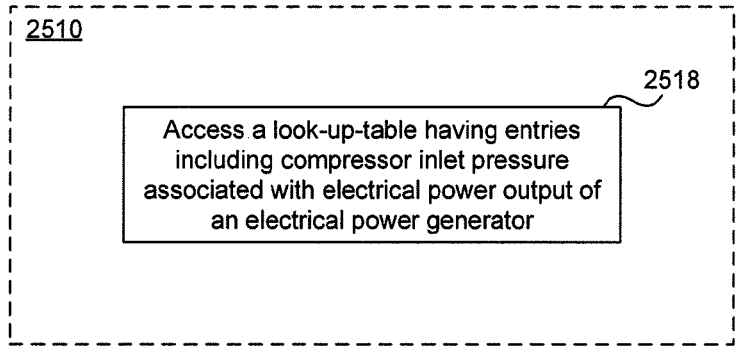
FIGS. 25B-25F illustrate details of the method of the flowchart of FIG. 25A.

Referring to FIG. 25B, in some embodiments correlating compressor inlet pressure with a second electrical power output level requested of the electrical power generator at the block 2510 may include accessing a look-up-table having entries including compressor inlet pressure associated with electrical power output of an electrical power generator at a block 2518.

Figure 25C:
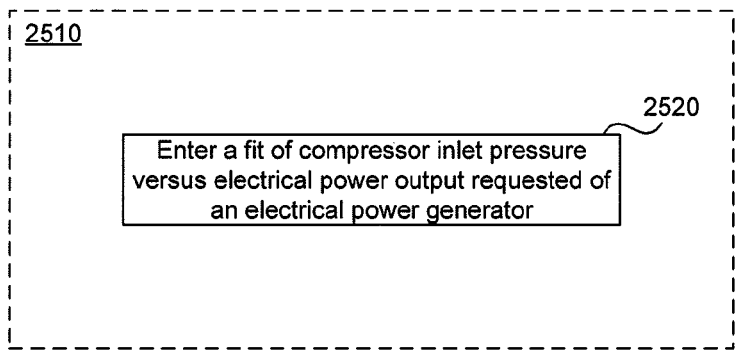

Referring to FIG. 25C, in some embodiments correlating compressor inlet pressure with a second electrical power output level requested of the electrical power generator at the block 2510 may include entering a fit (e.g., a curve fit) of compressor inlet pressure versus electrical power output requested of an electrical power generator at a block 2520.

Figure 25D:
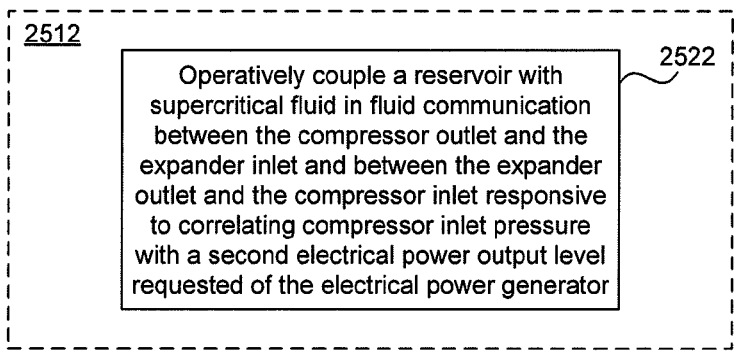

Referring to FIG. 25D, in some embodiments controlling compressor inlet pressure to a second compressor inlet pressure responsive to correlating compressor inlet pressure with a second electrical power output level requested of an electrical power generator at the block 2512 may include operatively coupling a reservoir with supercritical fluid in fluid communication between the compressor outlet and the expander inlet and between the expander outlet and the compressor inlet responsive to correlating compressor inlet pressure with a second electrical power output level requested of the electrical power generator at a block 2522.

Figure 25E:
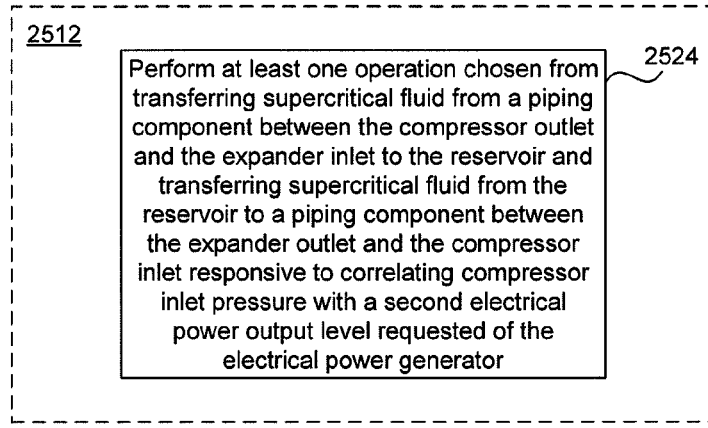

Referring to FIG. 25E, in some embodiments controlling compressor inlet pressure to a second compressor inlet pressure responsive to correlating compressor inlet pressure with a second electrical power output level requested of an electrical power generator at the block 2512 may further include performing at least one operation chosen from transferring supercritical fluid from a piping component between the compressor outlet and the expander inlet to the reservoir and transferring supercritical fluid from the reservoir to a piping component between the expander outlet and the compressor inlet responsive to correlating compressor inlet pressure with a second electrical power output level requested of the electrical power generator at a block 2524.

Figure 25F:
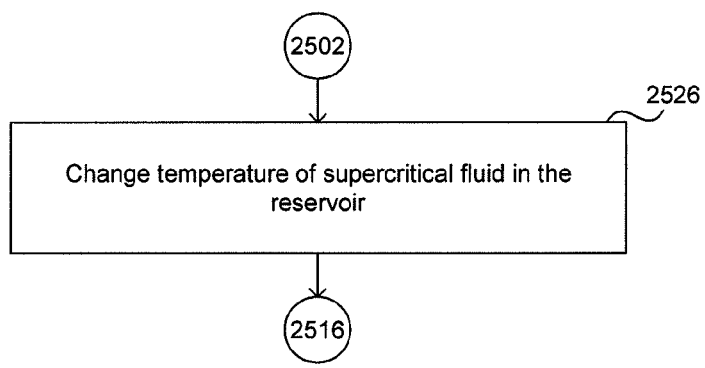

Referring to FIG. 25F, in some embodiments temperature of supercritical fluid in the reservoir may be changed at a block 2526.

The following U.S. Applications, filed concurrently herewith, are incorporated herein by reference: U.S. patent application Ser. No. 13/843,033, titled "MODULAR POWER INFRASTRUCTURE NETWORK, AND ASSOCIATED SYSTEMS AND METHODS" and U.S. patent application Ser. No. 13/843,517 titled "THERMODYNAMIC CYCLE WITH COMPRESSOR RECUPERATION, AND ASSOCIATED SYSTEMS AND METHODS".

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any suitable arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any suitable order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A part load control system for controlling partial loading of an electrical power generator, the electrical power generator being part of an electrical power generating system, the electrical power generating system being operative to execute a thermodynamic cycle using a supercritical fluid and including (a) at least a first compressor having an inlet and an outlet and being structured to compress supercritical fluid, and (b) an expander having an inlet coupled to receive compressed supercritical fluid, an outlet, and being structured to convert a drop in enthalpy of supercritical fluid to mechanical energy, the expander being coupled to the electrical power generator, the part load control system including:
   a computer controller system operatively coupled to the electrical power generator and programmed to control a compressor inlet pressure directly responsive to a level of electrical power output requested of the electrical power generator; and
   a reservoir with supercritical fluid, and responsive to the computer controller system to add supercritical fluid to, or withdraw supercritical fluid from, the electrical power generating system, the reservoir being in fluid communication with the electrical power generating system between the compressor outlet and the expander inlet and between the expander outlet and the compressor inlet.

2. The system of claim 1, wherein the computer controller system includes a computer processing component programmed to correlate compressor inlet pressure with electrical power output requested of an electrical power generator.

3. The system of claim 2, wherein the computer processing component is programmed to implement at least one of a look-up table having entries including compressor inlet pressure associated with electrical power output of an electrical power generator and a fit to compressor inlet pressure versus electrical power output requested of an electrical power generator.

4. The system of claim 1, wherein the computer controller system is programmed to monitor a plurality of parameters including:
   temperature of supercritical fluid in the reservoir, between a compressor outlet and an expander inlet, and between an expander outlet and a compressor inlet;
   pressure of supercritical fluid in the reservoir, between a compressor outlet and an expander inlet, and between an expander outlet and a compressor inlet;
   electrical power output requested of an electrical power generator; and
   actual electrical power output from an electrical power generator.

5. The system of claim 1, wherein the reservoir includes a heat exchanger disposed therein, the heat exchanger being operable responsive to the controller system.

6. A system comprising:
   an electrical power generating system operative to execute a thermodynamic cycle using a supercritical fluid, the electrical power generating system including:
      at least one compressor having an inlet and an outlet and being structured to compress supercritical fluid;
      an expander having an inlet coupled to receive compressed supercritical fluid, having an outlet, and being structured to convert a drop in enthalpy of supercritical fluid to mechanical energy; and
      an electrical power generator coupled to the expander; and
   a part load control system configured to control partial loading of the electrical power generator, the part load control system including:
      a computer controller system operatively coupled to the electrical power generator to control compressor inlet pressure directly responsive to a level of electrical power output requested of the electrical power generator; and
      a reservoir with supercritical fluid, the reservoir being responsive to the computer controller system to add supercritical fluid to, or withdraw supercritical fluid from, the electrical power generating system, the reservoir being in fluid communication with the at least one compressor and the expander between the compressor outlet and the expander inlet and between the expander outlet and the compressor inlet.

7. The system of claim 6, wherein the computer controller system includes a computer processing component programmed to correlate compressor inlet pressure with electrical power output requested of the electrical power generator.

8. The system of claim 7, wherein the computer processing component is programmed to implement at least one of a look-up table having entries including compressor inlet pressure associated with electrical power output of the electrical power generator and a fit to compressor inlet pressure versus electrical power output requested of the electrical power generator.

9. The system of claim 6, wherein the computer controller system is programmed to monitor a plurality of parameters including:
   temperature of supercritical fluid in the reservoir, between the compressor outlet and the expander inlet, and between the expander outlet and the compressor inlet;
   pressure of supercritical fluid in the reservoir, between the compressor outlet and the expander inlet, and between the expander outlet and the compressor inlet;
   electrical power output requested of the electrical power generator; and
   actual electrical power output from the electrical power generator.

10. The system of claim 6, wherein:
   the compressor inlet has a first pressure and the compressor outlet has a second pressure that is greater than the first pressure; and
   the reservoir has a third pressure that is between the first pressure and the second pressure.

11. The system of claim 6, wherein the part load control system includes a first isolation valve disposed between the reservoir and a piping component between the compressor outlet and the expander inlet and a second isolation valve disposed between the reservoir and a piping component between the expander outlet and the compressor inlet, the first and second valves being operable responsive to the computer controller system.

12. The system of claim 11, further comprising a cooler structured to cool expanded supercritical fluid from the expander and provide cooled supercritical fluid to the compressor, and wherein the second isolation valve is disposed between the reservoir and a piping component coupled to an inlet of the cooler.

13. The system of claim 6, wherein the reservoir includes a heat exchanger disposed therein, the heat exchanger being operable responsive to the computer controller system.

14. The system of claim 6, wherein:
the at least one compressor includes:
a first compressor structured to compress supercritical fluid, and wherein the inlet is a first inlet and the outlet is a first outlet; and
structured to compress supercritical fluid and having a second inlet coupled in parallel with the first inlet, and further having a second outlet; and wherein
the computer controller system is configured to control inlet pressure of the first and second compressors responsive to the level of electrical power output requested of the electrical power generator.

15. The system of claim 6, wherein:
the at least one compressor includes:
a first compressor structured to compress supercritical fluid, and wherein the inlet is a first inlet and the outlet is a first outlet; and
a second compressor structured to compress supercritical fluid and having a second inlet coupled in fluid communication with the first outlet, and further having a second outlet; and wherein
the computer controller system is programmed to control inlet pressure of the first compressor responsive to the level of electrical power output from the electrical power generator.

16. A method of controlling partial loading of an electrical power generator, the method including:
compressing a supercritical fluid with at least a first compressor having an inlet and an outlet, the compressor having a first inlet pressure;
expanding supercritical fluid and converting a drop in enthalpy of supercritical fluid to mechanical energy with an expander having an inlet coupled to receive compressed supercritical fluid, the expander having an outlet;
generating electricity at a first electrical power output level with an electrical power generator coupled to the expander;
correlating compressor inlet pressure directly with a second electrical power output level requested of the electrical power generator;
controlling compressor inlet pressure to a second compressor inlet pressure directly responsive to correlating compressor inlet pressure with a second electrical power output level requested of an electrical power generator; and
generating electricity at the second electrical power output level directly responsive to controlling compressor inlet pressure to the second compressor inlet pressure.

17. The method of claim 16, wherein correlating compressor inlet pressure with the second electrical power output level requested of the electrical power generator includes accessing a look-up-table having entries including compressor inlet pressure associated with electrical power output of the electrical power generator.

18. The method of claim 16, wherein correlating compressor inlet pressure with a second electrical power output level requested of the electrical power generator includes entering a fit of compressor inlet pressure versus electrical power output requested of an electrical power generator.

19. The method of claim 16, wherein controlling compressor inlet pressure to the second compressor inlet pressure includes operatively coupling a reservoir with supercritical fluid between the compressor outlet and the expander inlet and between the expander outlet and the compressor inlet responsive to correlating the compressor inlet pressure with the second electrical power output level requested of the electrical power generator.

20. The method of claim 19, wherein controlling compressor inlet pressure further includes performing at least one operation chosen from:
transferring supercritical fluid from a piping component between the compressor outlet and the expander inlet to the reservoir; and
transferring supercritical fluid from the reservoir to a piping component between the expander outlet and the compressor inlet responsive to correlating compressor inlet pressure with a second electrical power output level requested of the electrical power generator.

21. The method of claim 19, further comprising changing a temperature of supercritical fluid in the reservoir.

22. A system comprising:
a supercritical power module including:
a compressor having an inlet and an outlet and being structured to compress supercritical fluid;
a recuperator structured to heat compressed supercritical fluid;
an outlet path structured to provide heated compressed supercritical fluid from the recuperator to a heat source;
an inlet path structured to provide heated compressed supercritical fluid from the heat source;
an expander having an inlet coupled to receive heated compressed supercritical fluid from the heat source, the expander having an outlet, and being structured to convert a drop in enthalpy of supercritical fluid to mechanical energy;
an electrical power generator coupled to the expander; and
a cooler structured to cool expanded supercritical fluid from the expander and provide cooled supercritical fluid to the compressor; and
a part load control system configured to control partial loading of the electrical power generator, the part load control system including:
a computer controller system operatively coupled to the electrical power generator and programmed to control compressor inlet pressure directly responsive to a level of electrical power output requested of the electrical power generator; and
a reservoir with supercritical fluid, the reservoir being responsive to the computer controller system to add supercritical fluid to, or withdraw supercritical fluid from, the electrical power generating system, the reservoir being in fluid communication with the compressor and the expander between the compressor outlet and the expander inlet and between the expander outlet and the compressor inlet.

23. The system of claim 22, further comprising:
a supercritical fluid supply path structured to supply supercritical fluid from the supercritical power module; and a supercritical fluid return path structured to return supercritical fluid to the supercritical power module.

24. A system comprising:

a supercritical power module including:
- a first compressor structured to compress supercritical fluid;
- a first recuperator structured to heat compressed supercritical fluid from the first compressor;
- a second compressor structured to compress supercritical fluid in parallel with the first compressor;
- a second recuperator structured to heat compressed supercritical fluid from the first compressor and the second compressor;
- an outlet path structured to provide heated compressed supercritical fluid from the second recuperator to a heat source;
- an inlet path structured to provide heated compressed supercritical fluid from the heat source;
- an expander coupled to receive heated compressed supercritical fluid from the heat source and structured to convert a drop in enthalpy of supercritical fluid to mechanical energy; and
- a cooler structured to cool expanded supercritical fluid from the first recuperator and provide cooled supercritical fluid to the first compressor; and a part load control system configured to control partial loading of the electrical power generator, the part load control system including:
- a computer controller system operatively coupled to the electrical power generator and programmed to control first and second compressor inlet pressure directly responsive to level of electrical power output requested of the electrical power generator; and
- a reservoir with supercritical fluid, the reservoir being responsive to the computer controller system to add supercritical fluid to, or withdraw supercritical fluid from, the electrical power generating system, the reservoir being in fluid communication with the first and second compressors between the first and second compressor outlets and the expander inlet, and between the expander outlet and the first and second compressor inlets.

25. The system of claim 24, further comprising:

a supercritical fluid supply path structured to supply supercritical fluid from the supercritical power module; and a supercritical fluid return path structured to return supercritical fluid to the supercritical power module.

26. A system comprising:

a supercritical power module including:
- a first compressor structured to compress supercritical fluid;
- a first recuperator structured to heat compressed supercritical fluid from the first compressor;
- a second compressor structured to compress heated supercritical fluid received from the first recuperator;
- a second recuperator structured to heat compressed supercritical fluid from the second compressor;
- an outlet path structured to provide heated compressed supercritical fluid from the second recuperator to a heat source;
- an inlet path structured to provide heated compressed supercritical fluid from the heat source;
- an expander coupled to receive heated compressed supercritical fluid from the heat source and structured to convert a drop in enthalpy of supercritical fluid to mechanical energy;
- an electrical power generator coupled to the expander; and
- a cooler structured to cool expanded supercritical fluid from the first recuperator and provide cooled supercritical fluid to the first compressor; and a part load control system configured to control partial loading of the electrical power generator, the part load control system including:
- a computer controller system operatively coupled to the electrical power generator and programmed to control compressor inlet pressure directly responsive to a level of electrical power output requested of the electrical power generator; and
- a reservoir with supercritical fluid, responsive to the computer controller system to add supercritical fluid to, or withdraw supercritical fluid from, the electrical power generating system, the reservoir being in fluid communication with the first compressor, the second compressor, and the expander between the second compressor outlet and the expander inlet and between the expander outlet and the first compressor inlet.

* * * * *